(12) United States Patent
Karpenko et al.

(10) Patent No.: US 11,062,306 B2
(45) Date of Patent: Jul. 13, 2021

(54) SECURE REMOTE PAYMENT TRANSACTION PROCESSING USING A SECURE ELEMENT

(71) Applicant: Visa International Service Association, San Francisco, CA (US)

(72) Inventors: Igor Karpenko, Sunnyvale, CA (US); Oleg Makhotin, Paris (FR); Kiushan Pirzadeh, Foster City, CA (US); Glenn Powell, Fremont, CA (US); John Sheets, San Francisco, CA (US); Erick Wong, Menlo Park, CA (US)

(73) Assignee: Visa International Service Association, San Francisco, CA (US)

( * ) Notice: Subject to any disclaimer, the term of this patent is extended or adjusted under 35 U.S.C. 154(b) by 558 days.

(21) Appl. No.: 15/490,191

(22) Filed: Apr. 18, 2017

(65) Prior Publication Data

US 2017/0221056 A1  Aug. 3, 2017

Related U.S. Application Data

(63) Continuation of application No. 15/471,800, filed on Mar. 28, 2017, which is a continuation of application (Continued)

(51) Int. Cl.
*G06Q 20/32* (2012.01)
*G06Q 20/38* (2012.01)
*G06Q 20/40* (2012.01)

(52) U.S. Cl.
CPC ..... *G06Q 20/3829* (2013.01); *G06Q 20/3227* (2013.01); *G06Q 20/3278* (2013.01);
(Continued)

(58) Field of Classification Search
CPC .......... G06Q 2220/00; G06Q 2220/10; G06Q 2220/16
(Continued)

(56) References Cited

U.S. PATENT DOCUMENTS 5,878,138 A  3/1999 Yacobi
5,987,132 A  11/1999 Rowney
(Continued)

FOREIGN PATENT DOCUMENTS

CN  1394408 A  1/2003
CN  1842813  10/2006
(Continued)

OTHER PUBLICATIONS

Schneier, Applied Cryptography, 1996, 8 pages.
(Continued)

*Primary Examiner* — Dante Ravetti
(74) *Attorney, Agent, or Firm* — Kilpatrick Townsend & Stockton LLP

(57) ABSTRACT

Embodiments of the present invention are directed to methods, apparatuses, computer readable media and systems for securely processing remote transactions. One embodiment of the invention is directed to a method of processing a remote transaction initiated by a mobile device. The method comprises receiving, by a mobile payment application on a secure memory of the mobile device, transaction data from a transaction processor application on the mobile device. The method further comprises validating that the transaction processor application is authentic and in response to validating the transaction processor application, providing encrypted payment credentials to the transaction processor application. The transaction processor application further initiates a payment transaction with a transaction processor server computer using the encrypted payment credentials.

11 Claims, 8 Drawing Sheets

Related U.S. Application Data

No. 14/461,227, filed on Aug. 15, 2014, now Pat. No. 9,646,303.

(60) Provisional application No. 61/866,514, filed on Aug. 15, 2013.

(52) U.S. Cl.
CPC ..... *G06Q 20/38215* (2013.01); *G06Q 20/401* (2013.01); *G06Q 20/409* (2013.01)

(58) Field of Classification Search
USPC .......... 705/16, 21, 59, 71; 380/44, 262, 278, 380/279
See application file for complete search history.

(56) References Cited

U.S. PATENT DOCUMENTS

| | | |
|---|---|---|
| 6,192,473 B1 | 2/2001 | Ryan |
| 6,230,272 B1 | 5/2001 | Lockhart et al. |
| 6,286,099 B1 | 9/2001 | Kramer |
| 6,931,382 B2 | 8/2005 | Laage et al. |
| 7,096,354 B2 | 8/2006 | Wheeler et al. |
| 7,353,382 B2 | 4/2008 | Labrou et al. |
| 7,801,826 B2 | 9/2010 | Labrou et al. |
| 7,849,020 B2 | 12/2010 | Johnson |
| 8,121,942 B2 | 2/2012 | Carlson et al. |
| 8,121,956 B2 | 2/2012 | Carlson et al. |
| 8,224,702 B2 | 7/2012 | Mengerink et al. |
| 8,280,777 B2 | 10/2012 | Mengerink et al. |
| 8,313,022 B2 | 11/2012 | Hammad |
| 8,417,642 B2 | 4/2013 | Oren |
| 8,498,908 B2 | 7/2013 | Mengerink et al. |
| 8,538,845 B2 | 9/2013 | Liberty |
| 8,583,494 B2 | 11/2013 | Fisher |
| 8,589,291 B2 | 11/2013 | Carlson et al. |
| 8,589,691 B1 | 11/2013 | Hackborn et al. |
| 8,601,266 B2 | 12/2013 | Aabye et al. |
| 8,606,638 B2 | 12/2013 | Dragt |
| 8,606,700 B2 | 12/2013 | Carlson et al. |
| 8,606,720 B1 | 12/2013 | Baker et al. |
| 8,620,754 B2 | 12/2013 | Fisher |
| 8,635,157 B2 | 1/2014 | Smith et al. |
| 8,646,059 B1 | 2/2014 | von Behren et al. |
| 8,898,089 B2 | 11/2014 | Faith |
| 9,154,477 B2 | 10/2015 | Cambridge et al. |
| 9,294,468 B1 | 3/2016 | Kilbourn |
| 9,646,303 B2 | 5/2017 | Karpenko et al. |
| 2004/0059686 A1 | 3/2004 | Levesque |
| 2004/0250074 A1 | 12/2004 | Kilian-Kehr |
| 2005/0222961 A1 | 10/2005 | Staib et al. |
| 2006/0133615 A1 | 6/2006 | Bade et al. |
| 2006/0167812 A1* | 7/2006 | Bhambri ............... G06Q 30/06 705/59 |
| 2006/0235795 A1 | 10/2006 | Johnson |
| 2006/0271496 A1 | 11/2006 | Balasubramanian et al. |
| 2007/0022301 A1 | 1/2007 | Nicholson et al. |
| 2009/0106160 A1 | 4/2009 | Skowronek |
| 2009/0112747 A1 | 4/2009 | Mullen et al. |
| 2009/0307140 A1 | 12/2009 | Mardikar |
| 2010/0082481 A1* | 4/2010 | Lin ........................ G06Q 40/00 705/41 |
| 2010/0088518 A1 | 4/2010 | Dottax et al. |
| 2010/0169659 A1 | 7/2010 | Shnowske et al. |
| 2010/0211507 A1 | 8/2010 | Aabye et al. |
| 2010/0217709 A1 | 8/2010 | Aabye et al. |
| 2010/0250442 A1 | 9/2010 | Coppinger |
| 2010/0306076 A1 | 12/2010 | Taveau et al. |
| 2011/0016320 A1 | 1/2011 | Bergsten et al. |
| 2011/0131102 A1 | 6/2011 | Wang |
| 2011/0137802 A1 | 6/2011 | Spies et al. |
| 2011/0201306 A1* | 8/2011 | Ali Al-Harbi ..... G06Q 20/3223 455/411 |
| 2011/0231648 A1 | 9/2011 | Robertson et al. |
| 2011/0295753 A1 | 12/2011 | Reno |
| 2012/0072350 A1 | 3/2012 | Goldthwaite et al. |
| 2012/0123882 A1 | 5/2012 | Carlson et al. |
| 2012/0136796 A1 | 5/2012 | Hammad et al. |
| 2012/0143767 A1 | 6/2012 | Abadir |
| 2012/0143772 A1 | 6/2012 | Abadir |
| 2012/0158580 A1 | 6/2012 | Crisan |
| 2012/0203664 A1 | 8/2012 | Torossian et al. |
| 2012/0203666 A1 | 8/2012 | Torossian et al. |
| 2012/0226582 A1* | 9/2012 | Hammad ............... H04L 9/3234 705/26.41 |
| 2012/0233004 A1 | 9/2012 | Bercaw |
| 2012/0233685 A1 | 9/2012 | Palanigounder et al. |
| 2012/0265688 A1 | 10/2012 | Dinan |
| 2012/0289188 A1* | 11/2012 | Marcus ................... G06Q 20/12 455/406 |
| 2012/0300932 A1 | 11/2012 | Cambridge |
| 2012/0303503 A1 | 11/2012 | Cambridge et al. |
| 2012/0303961 A1 | 11/2012 | Kean et al. |
| 2013/0007849 A1 | 1/2013 | Coulter et al. |
| 2013/0019098 A1 | 1/2013 | Gupta et al. |
| 2013/0041831 A1 | 2/2013 | Das |
| 2013/0054473 A1 | 2/2013 | Jan et al. |
| 2013/0060706 A1 | 3/2013 | Aabye et al. |
| 2013/0066788 A1 | 3/2013 | Goodrich et al. |
| 2013/0080276 A1 | 3/2013 | Granbery |
| 2013/0110717 A1 | 5/2013 | Kobres |
| 2013/0117185 A1 | 5/2013 | Collison |
| 2013/0124290 A1 | 5/2013 | Fisher |
| 2013/0124291 A1 | 5/2013 | Fisher |
| 2013/0124364 A1 | 5/2013 | Mittal |
| 2013/0124421 A1 | 5/2013 | Deng |
| 2013/0138525 A1 | 5/2013 | Bercaw |
| 2013/0151405 A1 | 6/2013 | Head et al. |
| 2013/0159186 A1 | 6/2013 | Brudnicki et al. |
| 2013/0166456 A1 | 6/2013 | Zhang et al. |
| 2013/0173736 A1 | 7/2013 | Krzeminski et al. |
| 2013/0185202 A1 | 7/2013 | Goldthwaite et al. |
| 2013/0191290 A1 | 7/2013 | Glendenning |
| 2013/0212017 A1 | 8/2013 | Bangia |
| 2013/0246203 A1 | 9/2013 | Laracey |
| 2013/0254028 A1 | 9/2013 | Salci |
| 2013/0254117 A1 | 9/2013 | von Mueller et al. |
| 2013/0275308 A1 | 10/2013 | Paraskeva et al. |
| 2013/0290718 A1 | 10/2013 | Zhuang et al. |
| 2013/0297504 A1 | 11/2013 | Nwokolo |
| 2013/0308778 A1 | 11/2013 | Fosmark et al. |
| 2013/0311382 A1 | 11/2013 | Fosmark et al. |
| 2013/0317982 A1 | 11/2013 | Mengerink et al. |
| 2014/0007213 A1 | 1/2014 | Sanin et al. |
| 2014/0013106 A1 | 1/2014 | Redpath |
| 2014/0013114 A1 | 1/2014 | Redpath |
| 2014/0019367 A1 | 1/2014 | Khan et al. |
| 2014/0040137 A1 | 2/2014 | Carlson et al. |
| 2014/0040628 A1 | 2/2014 | Fort et al. |
| 2014/0188738 A1 | 7/2014 | Huxham |
| 2014/0222676 A1 | 8/2014 | Lee et al. |
| 2014/0236842 A1 | 8/2014 | Salminen |
| 2014/0282834 A1 | 9/2014 | Guinan |
| 2015/0019443 A1 | 1/2015 | Sheets et al. |
| 2015/0052064 A1 | 2/2015 | Karpenko et al. |
| 2015/0088756 A1 | 3/2015 | Makhotin et al. |
| 2017/0200156 A1 | 7/2017 | Karpenko et al. |
| 2017/0221056 A1 | 8/2017 | Karpenko et al. |

FOREIGN PATENT DOCUMENTS

| | | |
|---|---|---|
| CN | 101072384 | 11/2007 |
| CN | 101563870 A | 10/2009 |
| CN | 101567780 A | 10/2009 |
| CN | 101588577 | 11/2009 |
| CN | 101834946 A | 9/2010 |
| CN | 101853544 | 10/2010 |
| CN | 102341817 | 2/2012 |
| CN | 102456193 | 5/2012 |
| CN | 102480725 | 5/2012 |
| CN | 102609841 | 7/2012 |
| CN | 102685073 | 9/2012 |
| CN | 102685703 A | 9/2012 |

(56) References Cited

FOREIGN PATENT DOCUMENTS

| | | | |
|---|---|---|---|
| CN | 102742211 A | 10/2012 | |
| CN | 103116848 A | 5/2013 | |
| EP | 2600275 A1 | 6/2013 | |
| JP | 2003-044765 A | 2/2003 | |
| JP | 2007-513529 A | 5/2007 | |
| JP | 2010-526368 A | 7/2010 | |
| JP | 2012-252665 A | 12/2012 | |
| JP | 2013-512503 A | 4/2013 | |
| JP | 2014522067 | 8/2014 | |
| KR | 20030084294 | 11/2003 | |
| KR | 20060054419 A | 5/2006 | |
| KR | 20060117902 | 11/2006 | |
| KR | 10 2007 0083087 | 8/2007 | |
| KR | 20090102752 | 9/2009 | |
| KR | 10 2010 0111987 | 10/2010 | |
| KR | 20120076593 A | 7/2012 | |
| KR | 10-2012-0106238 A | 9/2012 | |
| KR | 10-2012-0110926 A | 10/2012 | |
| RU | 2376635 C2 | 12/2009 | |
| RU | 2394275 C2 | 7/2010 | |
| RU | 2467501 C2 | 11/2012 | |
| WO | 2006128215 A1 | 12/2006 | |
| WO | 2009/138848 A2 | 11/2009 | |
| WO | 2010033968 A1 | 3/2010 | |
| WO | 2012/151590 A2 | 11/2012 | |
| WO | 2012/167941 A1 | 12/2012 | |
| WO | 2013086423 | 6/2013 | |

OTHER PUBLICATIONS

ANSI-X9.63, Jul. 5, 1998, 125 pages.
Non-Final Office Action, dated Nov. 16, 2017, in U.S. Appl. No. 14/332,245, 27 pages.
Extended European Search Report, dated Feb. 23, 2017, in European Patent Application No. 148257819, 7 pages.
Final Office Action dated Jan. 16, 2018, in U.S. Appl. No. 14/493,247, 20 pages.
Japanese Office Action, dated Feb. 28, 2018, in Japanese Patent Application No. 2016-527053, 4 pages.
First Office Action, dated Jan. 31, 2019, in Chinese Patent Application No. 201480063714.5, 8 pages.
First Office Action, dated Mar. 21, 2019, in Chinese Patent Application No. 201480050582.2, 9 pages.
First Office Action, dated Dec. 27, 2018, in Chinese Patent Application No. 201480056590.8, 5 pages.
International Search Report and Written Opinion dated Nov. 26, 2014 for PCT Patent Application No. PCT/US2014/051371, 10 pages.
Supplementary European Search Report, dated Mar. 30, 2017, in EP Application No. EP 14836208, 8 pages.
Final Office Action, dated Sep. 14, 2018, in U.S. Appl. No. 14/332,245, 32 pages.
Decision on Grant, dated May 22, 2018, in Russian Application No. 2016115043, 6 pages.
International Search Report and Written Opinion dated Jan. 9, 2015 in PCT/US2014/056837, 9 pages.
Extended European Search Report dated Feb. 23, 2017 in EP 14825781.9, 7 pages.
Extended European Search Report dated Mar. 30, 2017 in EP 14836208.0, 8 pages.
Extended European Search Report dated Feb. 2, 2017 in EP 14845716.1, 8 pages.
Russian Official Action, dated May 18, 2018, in Russian Patent Application No. 2016104765, 5 pages.
Office Action in Korean Patent Application No. 2016-7003736, dated Dec. 18, 2017, 7 pages.
AU2014321178 , "Second Examination Report", dated Nov. 28, 2019, 4 pages.
CN201480063714.5 , "Office Action", dated Dec. 31, 2019, 13 pages.
AU2014306440 , "Second Examination Report", dated Nov. 27, 2019, 3 pages.
AU2018203139 , "First Examination Report", dated Oct. 14, 2019, 5 pages.
CN201480056590.8 , "Office Action", dated Dec. 13, 2019, 17 pages.
JP2018-132704 , "Office Action", dated Nov. 1, 2019, 6 pages.
"Public Key Certificate", Wikipedia, Available Online at: URL:https://en.wikipedia.org/w/index.php?title=Public_key_certificate&oldid=560998490, Jun. 22, 2013, 8 pages.
CN201480050582.2 , "Office Action", dated Sep. 27, 2019, 17 pages.
CN201480056590.8 , "Office Action", dated Jul. 29, 2019, 23 pages.
CN201480063714.5 , "Office Action", dated Aug. 12, 2019, 19 pages.
EP14825781.9 , "Office Action", dated Sep. 13, 2019, 7 pages.
EP14836208.0 , "Office Action", dated Jul. 22, 2019, 13 pages.
PCT/US2014/046764 , "International Search Report and Written Opinion", dated Nov. 19, 2014, 9 pages.
Pouralinazar , "The System for Secure Mobile Payment Transactions", Available online at: https://pdfs.semanticscholar.org/dc51/46b01ab79c25dbdcf94c436dce6068b4ff33.pdf, 2013, 78 pages.
U.S. Appl. No. 14/332,245 , "Notice of Allowability", dated Jan. 6, 2020, 3 pages.
U.S. Appl. No. 14/493,247 , Notice of Allowance, dated Jun. 24, 2020, 10 pages.
U.S. Appl. No. 15/471,800 , Final Office Action, dated Jul. 9, 2020, 32 pages.
Application No. CN201480050582.2 , Notice of Decision to Grant, dated Jul. 6, 2020, 4 pages.
EP14845716.1 , "Summons to Attend Oral Proceedings", Aug. 13, 2020, 8 pages.
Application No. KR2016-7006730 , Office Action, dated Jun. 18, 2020, 7 pages.
CN201480050582.2 , "Office Action", dated Feb. 25, 2020, 21 pages.
U.S. Appl. No. 15/471,800, Non-Final Office Action, dated Jan. 24, 2020, 32 pages.
EP14825781.9 , "Summons to Attend Oral Proceedings", Apr. 17, 2020, 13 pages.
EP14836208.0 , "Summons to Attend Oral Proceedings", Feb. 17, 2020, 17 pages.
KR10-2016-7003736 , "Notice of Decision to Grant", dated Mar. 10, 2020, 3 pages.
KR10-2018-7035630 , "Notice of Decision to Grant", dated Mar. 3, 2020, 5 pages.
Wikipedia , "X.509", Available Online at: URL:https://en.wikipedia.org/w/index.php?title-X.509&oldid=567241886, Aug. 5, 2013, 12 pages.
CN201480056590.8, "Office Action", dated Apr. 29, 2020, 15 pages.
IN201647013251, "First Examination Report", dated Jun. 3, 2020, 6 pages.
U.S. Appl. No. 15/471,800 , Non-Final Office Action, dated Jan. 27, 2021, 32 pages.
Application No. CN201480056590.8 , Notice of Decision to Grant, dated Jan. 27, 2021, 4 pages.
CN201480056590.8 , "Office Action", dated Oct. 23, 2020, 9 pages.
EP14825781.9 , "Office Action", dated Oct. 21, 2020, 4 pages.
KR10-2016-7006730 , "Notice of Decision to Grant", dated Nov. 25, 2020, 4 pages.
KR2020-7016682 , "Office Action", dated Sep. 9, 2020, 7 pages.
KR10-2021-7005596 , "Office Action", dated Apr. 12, 2021, 12 pages.
21151953.3, "Extended Search Report", dated May 14, 2021, pp. 1-14.
"Anonymous: X.509—Wikipedia", Aug. 5, 2013; XP055658864, Retrieved from the Internet: URL:https://en.wikipedia.org/w/index.php?Title=X.509&oldid=567241886; [retrieved on Jan. 16, 2020], 12 pages.

* cited by examiner

SECURE REMOTE PAYMENT TRANSACTION PROCESSING USING A SECURE ELEMENT

CROSS-REFERENCES TO RELATED APPLICATIONS

This application is a continuation application of U.S. application Ser. No. 15/471,800, filed on Mar. 28, 2017, which is a continuation application of U.S. patent application Ser. No. 14/461,227, filed on Aug. 15, 2014, which is a non-provisional of and claims the benefit of priority to U.S. Provisional Application No. 61/866,514, filed Aug. 15, 2013, which are hereby incorporated by reference in their entirety for all purposes.

This application is related to the subject matter of U.S. Non-Provisional application Ser. No. 14/332,245, filed Jul. 15, 2014, the entire contents of which are hereby incorporated by reference for all purposes. The above-referenced application is assigned to the same assignee as the present application.

BACKGROUND

An increasing number of consumers are using devices configured to use near-field communication (NFC) and other proximity communication protocols for payment transactions. For example, a consumer's mobile device may comprise NFC hardware and a secure element or other secure storage medium for storing sensitive account information. In order to conduct a payment transaction, the consumer may place the mobile device in proximity to a point of sale terminal, access device, or other proximity or contactless communication reader. The transaction may then be processed using secure payment information stored on the secure storage medium, without the user requiring to provide a physical credit card or manually enter a credit card number.

Consumers may also conduct online payment transactions using mobile devices. For example, a consumer may download a merchant application and select some items to purchase. Then, to conduct the payment transaction, the consumer may enter payment information using a physical or on-screen keyboard. However, the manual entry of payment information to merchant applications is often redundant, as the consumer may already have payment information stored in a secure storage medium. Further, the manual entry of payment information may introduce security risks such as a vulnerability to eavesdropping.

Accordingly, there is a need to allow a consumer to use secure payment credentials stored on a mobile device to initiate and process a remote transaction. However, the payment credentials stored on the mobile device are sensitive and the merchant applications on the mobile device may be open to hacking, spoofing, and other security threats. As such, there is a need to ensure the payment credentials stored securely on the mobile device are secured against potential malicious applications and threats on the mobile device during payment transaction processing.

Furthermore, traditional remote transactions have limited security features and a higher risk of fraud because a consumer is not present at a merchant or service provider for verification that the payment credentials have not been stolen or intercepted and are not being used by a malicious third party. Accordingly, there is a need to increase the security of remote transactions initiated from mobile devices.

Embodiments of the present invention address these problems and other problems individually and collectively.

BRIEF SUMMARY

Embodiments of the present invention are directed to methods, apparatuses, computer readable media and systems for securely processing remote transactions. For example, embodiments of the present invention allow consumers to use a mobile device comprising secure and sensitive payment credentials during a remote payment transaction initiated through a merchant website or merchant application. The merchant website or merchant application may utilize a secure element based mobile payment application to obtain payment credentials (e.g., account number and expiration date) instead of having the consumer provide the account number and expiry date using the keypad or obtaining the information from an unsecure memory. Embodiments provide a secure process for transferring sensitive payment information while protecting the sensitive information from untrusted, unsecure, and/or potentially malicious mobile applications (e.g., the merchant application).

Further, embodiments incorporate the generation of chip-based dynamic authentication data (e.g., dynamic cryptograms or other values) for remote transactions initiated though the mobile payment application and provide additional security over typical remote payment transactions. Accordingly, embodiments provide more secure and robust remote payment transaction systems. As such, embodiments enhance the security level of card not present transactions by providing unique, dynamic, and verifiable cryptograms in transactions that typically do not have the capability of including such security features.

One embodiment of the invention is directed to a method of processing a remote transaction initiated by a mobile device. The comprises receiving, by a mobile payment application on a secure memory of the mobile device, transaction data from a transaction processor application on the mobile device. The method further comprises validating that the transaction processor application is authentic and in response to validating the transaction processor application, providing encrypted payment credentials to the transaction processor application. The transaction processor application initiates a payment transaction with a transaction processor server computer using the encrypted payment credentials.

Another embodiment of the invention is directed to a mobile device including a processor and a computer-readable medium coupled to the processor. The computer-readable medium may comprise a transaction processor application configured to process a remote payment transaction. The mobile device may further comprise a secure processor and a secure computer-readable medium coupled to the secure processor. The secure computer-readable medium comprising code, executable by the secure processor, for performing a method of processing a remote transaction. The method may comprise receiving transaction data from the transaction processor application on the mobile device and validating that the transaction processor application is authentic. The method may further include providing encrypted payment credentials to the transaction processor application in response to validating the transaction processor application. The transaction processor application may initiate a payment transaction with a transaction processor server computer using the encrypted payment credentials.

Another embodiment of the invention is directed to a system for processing a remote transaction including a mobile device and a transaction processor server computer communicatively coupled to the mobile device. The mobile device may include a processor and a computer-readable medium coupled to the processor. The computer-readable medium may comprise a transaction processor application configured to process a remote payment transaction. The mobile device may further comprise a secure processor and a secure computer-readable medium coupled to the secure processor. The secure computer-readable medium comprising code, executable by the secure processor, for performing a method of processing a remote transaction. The method may comprise receiving transaction data from the transaction processor application on the mobile device and validating that the transaction processor application is authentic. The method may further include providing encrypted payment credentials to the transaction processor application in response to validating the transaction processor application. The transaction processor application may initiate a payment transaction with a transaction processor server computer using the encrypted payment credentials. The transaction processor server computer may be configured to provide transaction information to the mobile device, receive the encrypted payment information from the transaction processor application on the mobile device, decrypt the encrypted payment information using a transaction processor private key stored at the transaction processor server computer, and initiate transaction processing using the decrypted payment information.

These and other embodiments of the invention are described in further detail below.

DETAILED DESCRIPTION

Figure 1:
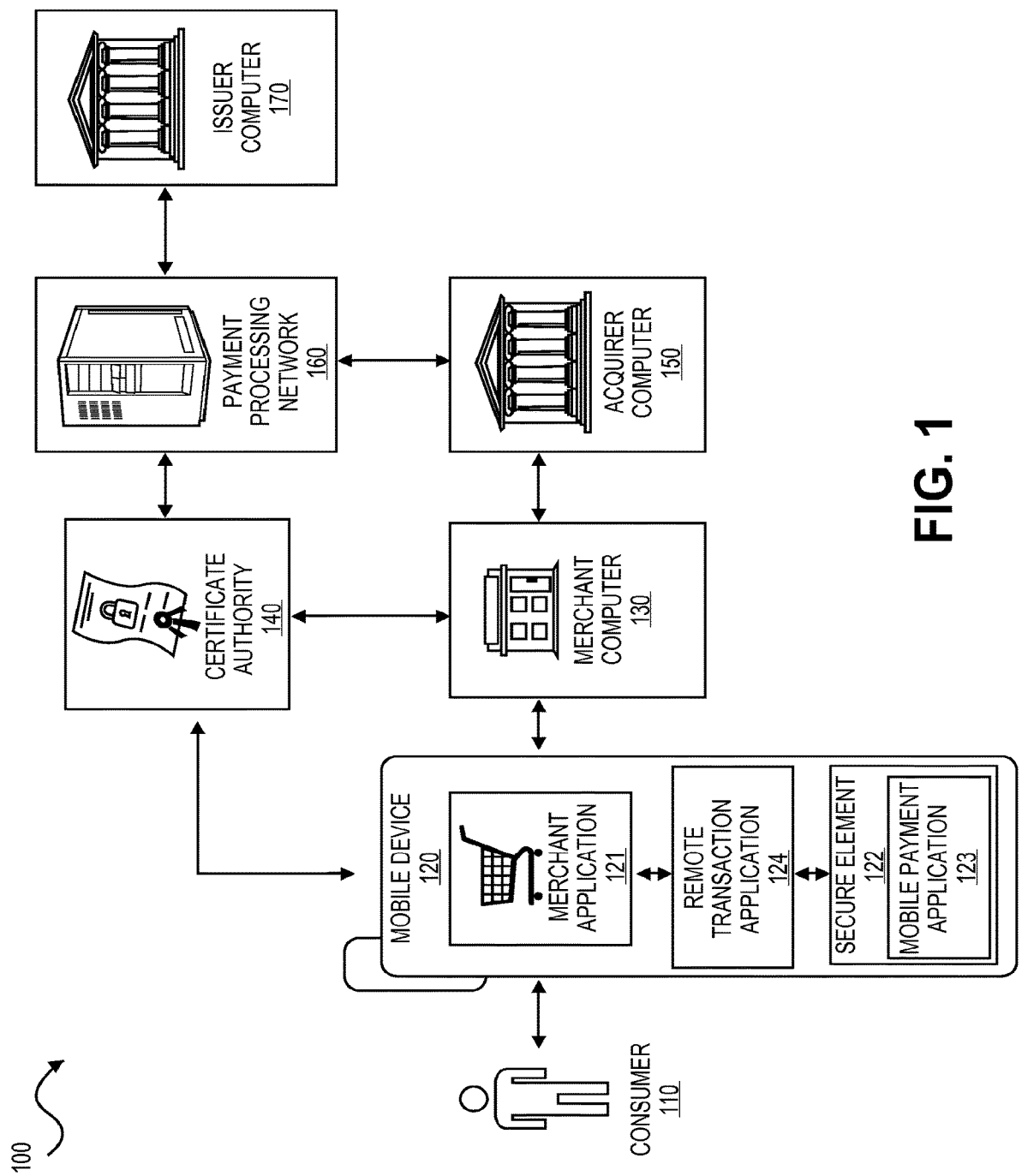
FIG. 1 shows a block diagram of an exemplary system for performing a remote transaction using a merchant application of a mobile device, according to some embodiments of the invention.

Embodiments of the present invention are directed to systems and methods for securely processing remote transactions initiated by untrusted merchant applications on a mobile device. Embodiments provide a secure transaction processing system that protects sensitive payment information stored in a secure memory of the mobile device and allows for transmission of that sensitive payment information in a secure manner to perform a remote payment transaction.

When performing a remote electronic commerce (i.e., e-commerce) transaction on a mobile device, a consumer may need to provide payment credentials (e.g., account identifier, expiration date, dynamic verification values, etc.) and other sensitive information to the merchant web server computer so that the merchant may identify the consumer account and initiate payment for the transaction. Normally a consumer may key enter or otherwise input a primary account number (PAN), expiration date, and card verification value (e.g., CVV2) into the mobile device which then sends that information to a merchant server. However, this method is not secure and may lead to fraudulent transactions. For example, there is no way for a merchant to know if the consumer is who they present themselves to be or if the consumer possesses the underlying payment device or merely intercepted or maliciously obtained the PAN, expiration date, and card verification value from the device and is using it without the proper authorization.

According to embodiments of the present invention, a merchant web server computer may securely obtain account credentials from a mobile payment application of a mobile device that securely stores the account information. Furthermore, because the remote transaction is being initiated through a mobile payment application on the mobile device, some embodiments may provide additional authentication data that further ensures that the account information on the mobile device is authentic and was provisioned or installed in an authorized manner. Accordingly, embodiments provide more secure remote payment transaction processing systems.

In some embodiments, the mobile payment application may obtain the account information from a secure element or secure memory of a mobile device. Additionally, because the transaction is being processed using a mobile payment application that may be configured to provide chip data (e.g., a dynamic value, cryptogram, etc.) during proximity or contactless communications, the remote transaction may include dynamic chip data (e.g., dynamic value or cryptogram) for the remote transaction. Typically, during an e-commerce transaction, a merchant would not be capable of receiving highly secure chip data (e.g., a dynamic value or cryptogram) because of the consumer key entry of account information and/or the lack of access to chip data. However, embodiments of the present invention provide a dynamic verification value, dynamic authentication information, and/or other chip data for validation during transaction processing.

Accordingly, embodiments allow a merchant computer 130 to securely receive both account credentials and chip data from a mobile payment application during a remote payment transaction. Therefore, a remote merchant server computer may receive sufficient data to build a standard "card present" chip transaction authorization request message which provides a higher level of security than a typical remote transaction.

Embodiments of the invention have several advantages. For example, embodiments improve the security of payment transactions using untrusted or unknown merchant applications on a mobile device. In some embodiments, a remote transaction application, a mobile payment application, and/ or any other third party application may be configured to validate the authenticity of a merchant application by determining the status of a merchant key certificate provided by the merchant application. Accordingly, the remote transaction application may ensure that the merchant certificate is currently valid with a certificate authority or other certificate database. For example, the remote transaction application may provide the merchant certificate identifier to a certificate authority and may receive a status of the certificate (e.g., valid, revoked, etc.) in return. If the certificate is revoked or out of date, the remote transaction application may receive an updated certificate from the certificate authority and may continue with the transaction.

Additionally, a remote transaction application or mobile payment application may validate that the merchant certificate is authentic using a certificate authority public key. For example, the mobile payment application may have the certificate authority public key stored in the secure element or other secure memory of the mobile device or may have access to the key from the general purpose memory of the mobile device. The merchant certificate may be signed by a private key of the certificate authority and thus, the mobile payment application may apply the corresponding certificate authority public key in order to validate that the merchant certificate was signed by the certificate authority. Accordingly, if the mobile payment application can validate the signature by the certificate authority private key, the mobile payment application may determine that the certificate authority provided the merchant certificate, the merchant certificate is authentic, and that the merchant certificate can be trusted.

Accordingly, if the merchant application is validated, the mobile payment application may extract the public key from the merchant certificate and may use the public key to encrypt sensitive payment information (e.g., payment credentials (e.g., primary account number (PAN), token, expiration date, etc.), dynamic verification value, transaction amount, etc.) for delivery to a merchant computer 130 for remote transaction processing. The use of the merchant public key prevents unscrupulous applications or devices from gaining access to the sensitive data, since the payment information is unreadable without the corresponding validated transaction processor private encryption key (e.g., merchant private key, merchant application private key, acquirer private key, etc.).

The merchant computer 130 may securely store the corresponding private key associated with the merchant public-private key pair and may use the private key to decrypt the payment information and initiate a transaction. For example, the merchant server computer may initiate a payment transaction by mapping the decrypted payment information to an authorization request message configured to be processed by a payment processing network. As such, embodiments may ensure the merchant application is authentic and may secure information using encryption keys provided by the merchant application to ensure only the merchant computer 130 associated with the merchant application may decrypt and/or access the secure payment information. Accordingly, remote transactions may be secured and may use dynamic verification data that typically is not available in such transactions.

Additionally, embodiments provide more secure payment systems by allowing the use of highly secure and difficult to reproduce information during a remote transaction. For example, the dynamic cryptogram or dynamic value provided during the transaction allows for a higher level of trust by a merchant that the consumer is authorized to perform a transaction using the account. Accordingly, fewer fraudulent transactions and charge backs will be processed by payment processing networks, issuers, and merchants.

Furthermore, embodiments are more convenient to consumers and users because the system allows for a consumer to use payment information (e.g., account information) that is already present on a mobile device to initiate and process a transaction. Previous remote transactions required a consumer to enter payment information manually or used information that was not stored in a secure memory. Accordingly, embodiments provide a more secure and convenient method for consumers to initiate remote transactions from a mobile device.

Further, because of the use of a transaction processor (e.g., merchant, acquirer, etc.) specific public key by the mobile payment application when passing the payment credentials, the sensitive payment information may be protected when being transmitted or communicated to a destination entity. Accordingly, embodiments provide a secure communication process for transmitting sensitive information related to a remote transaction to allow for protection of sensitive account credentials and other payment information that may be static and re-used in future transactions (e.g., static account identifiers, expiration date, etc.).

Prior to discussing embodiments of the invention, description of some terms may be helpful in understanding embodiments of the invention.

A "remote transaction" may include any transaction where one party to a transaction is separated by some distance and/or by a device from another party to a transaction. For example, a remote transaction may include a "card-not present," electronic commerce, or other online transaction performed through communication between two or more devices. For instance, remote transactions may include devices that are not present in the same location or multiple devices where the two parties (e.g., a merchant and a consumer) are not using the same device to complete the transaction. A remote transaction may include any type of transaction including a person-to-person transaction, business-to-business transaction, retail or other provider-customer transaction, or any other type of transaction using any type of account (e.g., debit, credit, pre-paid, etc.).

Additionally, a remote transaction may include an in-store transaction that is not completed using a merchant point-of-sale device (i.e., access device) and instead is completed by a consumer using their mobile device to communicate with a remote (or local) merchant server computer configured to process the remote transactions. Traditionally, remote transactions have had a higher chance of fraud because remote transactions do not allow a payee the opportunity to identify the payer or otherwise ensure that the payment they are receiving is legitimate, as the two parties are not present in the same location during the transaction (such as in a "card present" or in-store transaction). A local, card present, face-to-face, or in-store transaction may include a transaction where two or more parties to a transaction are present in the same location and use the same transaction device, or is performed through at least one present individual or entity to authenticate the identity of a payer and/or payee.

As used herein, "payment information" may include any relevant information for performing a payment. For example, the payment information may include any sensitive account information and/or personal information that may be used to identify and/or authenticate a consumer account at an issuer. Further, in some embodiments, the payment information may also include merchant information, consumer information, mobile device information, routing information, or any other relevant information that may be used to administer, manage, and communicate payment transactions. As such, payment information may include both sensitive and non-sensitive information. For example, payment information may include the sensitive information associated with a transaction or account (e.g., payment credentials) and may be sent along with other non-sensitive information that may not be considered payment information (e.g., transaction amount, etc.).

As used herein, "payment credentials" may include any information that allows a processor to identify, verify, and/or process a payment transaction using a consumer account. For example, a payment credential may include an account identifier (e.g., primary account number (PAN)), a token (e.g., account identifier substitute), expiration date, card verification value (e.g., CVV, CVV2, etc.), a dynamic cryptogram or dynamic value (e.g., dCVV, dynamic authentication data, etc.), personal information associated with an account (e.g., name, address, etc.), an account alias (e.g., username, etc.), or any other relevant information.

In some embodiments, the payment credentials may be stored in a secure memory of a mobile device. In some embodiments, the secure memory may be referred to as a "secure element." The secure memory of the mobile device may be configured such that the data stored in the secure memory may not be directly accessible by outside applications and a mobile payment application associated with the secure memory may be accessed to obtain the payment credentials stored or provisioned on the secure memory. Accordingly, a merchant application may interface with a mobile payment application, a remote transaction application, or other application or applet in order to interface with the mobile payment application in order to gain access to the payment credentials stored on the secure memory. In some embodiments, a software development kit (SDK), an application programming interface (API), or other third party programming code or module may be accessed by a mobile application (e.g., merchant application) in order to interface and/or request payment information from a mobile payment application.

As used herein, "transaction information" or "transaction data" may include any data associated with a transaction. For example, transaction information may include a transaction amount, transaction time, transaction date, merchant information (e.g., registered merchant identifier, address, merchant computer internet protocol (IP) address, etc.), product information (e.g., serial numbers, product names or other identifiers, etc.), or any other relevant information to a transaction. The transaction information may be provided to a mobile device by a merchant server computer before or after the consumer initiates a payment transaction through the merchant application (or other transaction processor application). In some embodiments, the transaction information may be used to identify a specific merchant associated with a transaction to allow entities within the transaction processing system to identify the appropriate merchant (or other service provider) for the transaction.

As used herein, "merchant Information" may include any information that is associated with a merchant, payee, service provider, producer, or other relying party in a transaction. For example, merchant information may include a merchant identifier that was determined during registration with a remote payment service or application, payment processing network, or other transaction processing entity associated with the remote transaction processing system. In some embodiments, the merchant identifier may be used to determine a registered merchant computer public key, merchant application public key, and/or acquirer public key associated with a transaction.

A "dynamic value" may include any data that changes. For example, the dynamic value may change over time (e.g., periodically), use (e.g., per transaction), and/or change based on received information (e.g., input information to an algorithm). For instance, a dynamic value may include an authentication value that may change every time a transaction is initiated and may be generated using a shared secret algorithm or other shared information between two entities such that one entity may validate that the other entity has access to the shared secret and is thus, authentic. This may also be referred to as authentication data. The dynamic value may be generated by applying the shared secret algorithm to shared transaction data (e.g., amount, merchant information, etc.), payment credential information (account identifier, expiration date, etc.), and/or dynamic input date (e.g., time, unpredictable number used for the transaction, etc.). Any relevant dynamic algorithm and shared information may be used and different dynamic algorithms may be used for different types of transactions (e.g., remote vs. proximity (e.g., NFC) transaction).

In some embodiments, a dynamic value may include a cryptogram that is generated using a shared secret algorithm between two entities. For example, the cryptogram may be generated per transaction based on a derived algorithm that is specific to each consumer device and/or issuer account and may be validated at a payment processor or an issuer of the account for each transaction. For example, a payment processing network may be provided shared algorithms and/or encryption keys from an issuer associated with an account and may validate the dynamic values on behalf of the issuer. In other embodiments, the issuer may validate the dynamic data themselves. Such dynamic values may be referred to as dynamic card verification values (e.g., dCVV, dCVV2), unique authentication verification values (UAVV), token authentication verification value (TAVV), etc., and may be distinguished based on the input data and the algorithm used to generate the verifiable dynamic values. For example, a token authentication verification value may use a token as an input to a verification algorithm while a dynamic card verification value may use a primary account number as an input to generate the dCVV.

As used herein, "encrypted payment information" may include any payment information that has been made unintelligible to some parties to prevent unauthorized access to the payment information. For example, the encrypted payment information may not be read by a recipient without access to a shared secret or access to a designated encryption key. As such, the encrypted payment information may be made unintelligible through a process that is reversible and repeatable such that two entities can share information using a shared secret or encryption keys without unauthorized entities being able to understand or gain access to the sensitive payment information or sensitive payment credentials within the payment information (unless they gain access to the shared secret or encryption keys).

Additionally, in some embodiments, the encrypted payment information may include any combination of encrypted sensitive information and unencrypted less sensitive or non-sensitive information. For example, in some embodiments, encrypted payment information may include encrypted payment credentials (e.g., sensitive account identifiers and expiration dates) and unencrypted transaction information (e.g., transaction amount, product identifiers, etc.). In other embodiments, the encrypted payment information may include all of the relevant transaction information encrypted. For instance, in some embodiments, the encrypted payment information may include both encrypted payment credentials and encrypted transaction information.

In some embodiments, the encrypted payment information may be generated by a mobile payment application of a mobile device such that the mobile payment application may use a public encryption key (e.g., transaction processor public key) that may be used to encrypt stored or received payment credentials and/or other payment information for a transaction. For example, a mobile payment application may extract a transaction processor public encryption key from a transaction processor public key certificate (also referred to as a transaction processor digital certificate) after validating the public key certificate and may use the extracted transaction processor public key to encrypt the sensitive payment information. The extracted transaction processor public encryption key may be paired with a transaction processor private encryption key that may be securely stored at a transaction processor (e.g., merchant server computer, acquirer computer, merchant processor computer, etc.) configured to decrypt the encrypted payment information and initiate a payment transaction using the decrypted payment information.

As used herein, "decrypted payment information" may include payment information that has been converted from an unintelligible state to an understandable state. For example, decrypted payment information may include the result of applying an appropriate encryption key to encrypted payment information to obtain the original payment information. For instance, a transaction processor private key may be applied to encrypted payment information that was encrypted with a transaction processor public key in order to decrypt the encrypted payment information and obtain the underlying payment information. Further, where the encrypted payment information includes both encrypted and unencrypted information, the decrypted payment information may be obtained by decrypting the encrypted portions while not decrypting the unencrypted portions.

A "transaction processor" may include any entity that is associated with processing a transaction. For example, a merchant, a mobile device, a merchant application or other mobile application on a mobile device (e.g., an acquirer application, merchant processor application, or payment service provider application), an acquirer computer, a payment processing network, and any other entity in a transaction processing eco-system may be a transaction processor. In some embodiments, a transaction processor may be associated with a particular public key (e.g., merchant public key, merchant application public key, acquirer public key, etc.) and a private key (e.g., merchant private key, merchant application private key, acquirer private key, etc.) that may be used to encrypt and decrypt payment information during processing of a remote payment transaction.

As such, in some embodiments, the transaction processor may be the entity that is configured to decrypt the encrypted payment information and initiate a payment transaction. A payment transaction may be initiated through any suitable manner including passing the decrypted payment information to another party or by generating and/or mapping decrypted payment information to an authorization request message. For example, in some embodiments, the transaction processor may initiate a payment transaction by mapping the decrypted payment information to an authorization request message configured to be processed by a payment processing network.

A "transaction processor application" may include any software, code, applet, or other information executable by a processor to initiate and process a remote transaction associated with a transaction processor. For example, a transaction processor application may include a merchant-specific application that is designed to allow for remote transaction processing on a mobile device. Alternatively or in combination, the transaction processing application may be provided by an acquirer, merchant processor, payment service provider, or other third party aggregator that allows for transactions from multiple merchants and/or suppliers to be processed through a single application.

A "transaction processor server computer" may include any computer, server, system, or device that is configured to process a remote transaction. For example, a transaction processor server computer may be configured to communicate with a transaction processor application during remote transaction processing in order to initiate a payment transaction associated with transaction data and payment credentials received from the transaction processor application. The transaction processor server computer may be configured to initiate a transaction that is configured to be processed by a payment processing network. For example, the transaction processor server computer may be configured to receive encrypted or decrypted payment information, generate an authorization request message, and send the authorization request message to an acquirer computer, payment processing network computer, or other entity configured to process a transaction. For instance, the transaction processor server computer may include a merchant computer 130, acquirer computer, merchant processor computer, payment service provider computer, or any other entity configured to process transactions received from the transaction processor application.

A "mobile payment application" may include any application configured to facilitate a payment transaction from a mobile device or other electronic device. For example, a mobile payment application may store sensitive payment information and/or payment credentials for a consumer account in a secure manner such that the payment information, account information, payment credentials, personal information, or any other relevant information may be protected from unauthorized access. The mobile payment application may be configured to provide the sensitive information to an authorized software application or module on a mobile device, a contactless element, or any other software or hardware configured and authorized to communicate with the mobile payment application. For example, a mobile payment application may be configured to interface with other mobile applications or merchant applications on a mobile device in order to provide payment information for a transaction. For instance, the mobile payment application may provide a software development kit (SDK) or application programming interface (API) that merchant applications and/or other mobile applications may use to interface with the mobile payment application. The mobile payment application may be configured to provide the sensitive information in encrypted form using extracted public keys from a transaction processor public key certificate received during a transaction or using stored keys on a secure memory.

Further, in some embodiments, the mobile payment application may comprise any API, service, application, applet, or other executable code suitable to retrieve payment information from a secure element, generate payment information (e.g., a dynamic value using an unpredictable number, etc.) for a transaction, encrypt the payment information using an extracted transaction processor public key, and communicate with a remote transaction application, transaction processor application (e.g., merchant application, acquirer application, etc.), and/or any other application in order to securely communicate the encrypted payment information to a transaction processor server computer (e.g., merchant computer 130, acquirer computer, etc.). The mobile payment application may further be configured to obtain securely stored information including a payment processing network public key, payment credentials, third party keys (e.g., certificate authority public keys), etc., and may be capable of communicating with a mobile gateway to obtain issuer updates for the account information stored on the secure element or other secure memory using over the air updates.

Over the air updates may be provided for any relevant information on the mobile payment application. For example, one or more of the certificate authority public keys stored in the secure element and/or accessed by the mobile payment application may be updated using over the air issuer updates. Further information regarding the capabilities of the mobile gateway may be found in U.S. application Ser. No. 13/662,843, filed Oct. 29, 2012, titled "Over The Air Update of Payment Transaction Data Stored in Secure Memory," U.S. application Ser. No. 12/563,410, filed Sep. 21, 2009, titled "Apparatus and Method for Preventing Unauthorized Access to Payment Application Installed in Contactless Payment Device," and U.S. application Ser. No. 13/563,421, filed Sep. 21, 2009, titled "Over The Air Update of Payment Transaction Data Stored in Secure Memory," which are hereby incorporated by reference in their entirety, for all purposes.

A "merchant application" may include any application associated with a party to a transaction. For example, a merchant application may be associated with a particular merchant or may be associated with a number of different merchants and may be capable of identifying a particular merchant (or multiple merchants) which are parties to a transaction. For instance, the merchant application may store information identifying a particular merchant server computer that is configured to provide a sales environment in which the merchant server computer is capable of processing remote transactions initiated by the merchant application. Further, the merchant application may also include a general purpose browser or other software designed to interact with multiple merchant server computers as long as the browser is configured to identify the merchant server computer and process a remote transaction. The merchant application may be installed on general purpose memory of a mobile device and thus, may be susceptible to malicious attacks, cracks, etc. Accordingly, the merchant application may be treated as an untrusted or unknown application by secure systems within the mobile device and remote payment transaction processing system.

In some embodiments, a merchant application may store a merchant public key certificate (also referred to as a merchant certificate) associated with a merchant computer 130 configured to process a remote transaction. The merchant public key certificate may include a merchant name, a certificate identifier, certificate authority information, a public key associated with the merchant computer 130, may be signed by a private key of a certificate authority, and may be verifiable as being authentic by an entity having a certificate authority public key. The merchant public key certificate may include any other information that allows an entity to validate and/or verify the authenticity of a merchant application and/or merchant computer 130 associated with the merchant certificate.

In some embodiments, a merchant application may initiate a payment transaction by sending decrypted payment information to a merchant server computer and the merchant server computer may then generate an authorization request message for the payment transaction using the decrypted payment information. In other embodiments, the merchant application may be configured to generate an authorization request message and send the authorization request message to a merchant server for processing.

Additionally, in some embodiments, a merchant application may be operated by or associated with an acquirer, payment service provider, or back-end processor that is operating on behalf of one or more merchants and/or processing one or more merchants' remote transactions. For example, the merchant application may include a payment service provider that is configured to process remote transactions on behalf of a merchant computer 130. Additionally, an acquirer may process transactions on behalf of merchant computers and may provide an acquirer application that performs similar functionality to the merchant application by allowing consumers to initiate remote payments through the acquirer application.

A "public/private key pair" may include a pair of linked cryptographic keys generated by an entity. The public key may be used for public functions such as encrypting a message to send to the entity or for verifying a digital signature which was supposedly made by the entity. The private key, on the other hand may be used for private functions such as decrypting a received message or applying a digital signature. The public key will usually be authorized by a body known as a certification authority (i.e., certificate authority) which stores the public key in a database and distributes it to any other entity which requests it. The private key will typically be kept in a secure storage medium and will usually only be known to the entity. However, the cryptographic systems described herein may feature key recovery mechanisms for recovering lost keys and avoiding data loss. The public/private key pairs may be generated using RSA or elliptic curve cryptography (ECC) techniques as well as any other relevant techniques associated with public key infrastructure (PKI).

A "public key" may include any encryption key that may be shared openly and publicly. The public key may be designed to be shared and may be configured such that any information encrypted with the public key may only be decrypted using a private key associated with the public key (i.e., a public/private key pair).

A "private key" may include any encryption key that may be protected and secure. For example, the private key may be securely stored at an entity that generates a public/private key pair and may be used to decrypt any information that has been encrypted with the associated public key of the public/private key pair.

A "digital signature" may refer to the result of applying an algorithm which allows a signing party to manifest, and a verifying party to verify, the authenticity and integrity of a document or other data. For example, for a public/private key pair, the signing party may act by means of the private key (i.e., signing the data with the private key) and the verifying party may act by means of the public key (i.e., validating the signed data using the public key). This process may certify the authenticity of the sender and the integrity of the signed document because of the so-called principle of nonrepudiation which does not allow disowning what has been signed. A certificate or other data that includes a digital signature by a signing party is said to be "signed" by the signing party.

A "certificate" may include an electronic document or data file that establishes the identity and/or authenticity of an entity. For example, a certificate may use a digital signature to bind a public key with data associated with an identity. The certificate may include one or more data fields, such as the legal name of the identity, a serial number of the certificate (i.e., certificate identifier), a valid-from and valid-to date for the certificate, certificate-related permissions, or any other relevant information to identify and/or authenticate an entity or the certificate itself. For instance, a certificate may contain a "valid-from" date indicating the first date the certificate is valid, and a "valid-to" date indicating the last date the certificate is valid. Further, a certificate may also contain a hash of the data in the certificate including the data fields. Additionally, each certificate may be signed by a certificate authority private key to allow relying entities to validate the certificate by applying a certificate authority public key to the certificate.

For example, "transaction processor certificate" may include any certificate associated with any entity configured to process a remote transaction. For example, the transaction processor certificate may be generated during an on-boarding or other registration step with a mobile payment application, certificate authority, remote transaction application, payment processing network, issuer, or other remote transaction processor associated with the remote transaction processing system. Accordingly, the transaction processor certificate may be provided by a certificate authority during on-boarding or registration for a remote payment transaction system. The transaction processing certificate may include a public key associated with the transaction processor and the transaction processor may securely store the private key associated with the transaction processor public key.

A "certificate authority" may include any entity configured to issue certificates. The certificate authority may prove its identity using a certificate authority certificate, which includes the certificate authority's public key. The certificate authority certificate may be signed by another certificate authority's private key, or may be signed by the same certificate authority's private key. The latter is known as a self-signed certificate. The certificate authority also typically maintains a database of all certificates issued by the certificate authority.

In a typical certificate issuing process, the certificate authority receives an unsigned certificate from an entity whose identity is known. The unsigned certificate includes a public key, one or more data fields, and a hash of the data in the certificate. The certificate authority may sign the certificate with a private key corresponding to the public key included on the certificate authority certificate. The certificate authority may then store the signed certificate in a database, and issue the signed certificate to the entity. Thereafter, the entity may use the certificate as a means for presenting the authenticity and identity of the entity.

In some embodiments, a certificate authority may include any of the entities from the transaction processing ecosystem. For example, a payment processing network, issuer, acquirer, or any other entity within the transaction system may also be responsible for issuing and certifying certificates. For instance, a merchant, merchant application, or acquirer computer that is configured to process remote transactions may be register with a payment processing network, mobile wallet provider, or any other third party in order to obtain a public key certificate signed by the respective entity that allows the entity to validate the certificate and ensure the certificate is valid for any given transaction. In some embodiments, an entity within the remote payment transaction processing system may contact a certificate authority to determine whether the status of a certificate has been updated, is in good standing, has been revoked, etc. Accordingly, the certificate authority may be configured to provide status information regarding issued certificates.

A "server computer" may include a powerful computer or cluster of computers. For example, the server computer can be a large mainframe, a minicomputer cluster, or a group of servers functioning as a unit. In one example, the server computer may be a database server coupled to a web server. The server computer may be coupled to a database and may include any hardware, software, other logic, or combination of the preceding for servicing the requests from one or more client computers. The server computer may comprise one or more computational apparatuses and may use any of a variety of computing structures, arrangements, and compilations for servicing the requests from one or more client computers. A server computer may comprise a processor and a computer-readable medium coupled to the processor. The computer-readable medium may comprise code, executable by the processor, for perform any software program or other methods and functionality associated with the server computer.

I. Exemplary Systems for Processing Remote Mobile Payment Transactions Using a Secure Element FIG. 1 shows a block diagram of an exemplary system 100 for performing a remote transaction using a secure element 122 and a merchant application 121 of a mobile device 120, according to some embodiments of the invention. The system 100 comprises a user (e.g., consumer 110), a mobile device 120 including a merchant application 121, a secure element 122, a mobile payment application 123, and a remote transaction application 124, a merchant computer 130, a certificate authority 140, an acquirer computer 150, a payment processing network 160, and an issuer computer 170. The various entities may be configured to communicate with one another over any suitable wireless or wired communication network and using any suitable communications protocol, including open or proprietary communications protocols.

As used herein, an "issuer" may typically refer to a business entity (e.g., a bank) that maintains financial accounts for a user and often issues a portable consumer device such as a credit or debit card to the user. The issuer may also issue or provision account information to a mobile device 120 to allow for mobile payments initiated by the mobile device 120. A "merchant" is typically an entity that engages in transactions and can sell goods or services. An "acquirer" is typically a business entity (e.g., a commercial bank) that has a business relationship with a particular merchant or other entity. Some entities can perform both issuer and acquirer functions. Some embodiments may encompass such single entity issuer-acquirers. Each of the entities may comprise one or more computer apparatuses (e.g., merchant computer 130, acquirer computer 150, payment processing network computer 160, and issuer computer 170) to enable communications, or to perform one or more of the functions described herein.

The payment processing network 160 may include data processing subsystems, networks, and operations used to support and deliver certificate authority services, authorization services, exception file services, transaction scoring services, and clearing and settlement services. An exemplary payment processing network 160 may include VisaNet™. Payment processing networks such as VisaNet™ are able to process credit card transactions, debit card transactions, and other types of commercial transactions. VisaNet™, in particular, includes a VIP system (Visa Integrated Payments system) which processes authorization requests and a Base II system which performs clearing and settlement services.

The payment processing network 160 may include one or more server computers. A server computer is typically a powerful computer or cluster of computers. For example, the server computer can be a large mainframe, a minicomputer cluster, or a group of servers functioning as a unit. In one example, the server computer may be a database server coupled to a web server. The payment processing network 160 may use any suitable wired or wireless network, including the Internet.

In some card present or in-store payment transactions, the user purchases a good or service at a merchant location using a mobile device 120. For example, the user's mobile device 120 can interact with an access device (not shown) at a merchant associated with merchant computer 130. For example, the user may tap the mobile device 120 against an near-field communication (NFC) reader in the access device. Alternatively, in a remote or "card not present" transaction, the user may indicate payment details to a merchant computer 130 electronically over a communications network, such as in an online transaction.

An authorization request message may be generated by mobile device 120 or merchant computer 130 and then forwarded to the acquirer computer 150. After receiving the authorization request message, the authorization request message is then sent to the payment processing network 160. The payment processing network 160 then forwards the authorization request message to the corresponding issuer computer 170 associated with an issuer associated with the user.

An "authorization request message" may be an electronic message that is sent to a payment processing network 160 and/or an issuer computer 170 of a payment card to request authorization for a transaction. An authorization request message according to some embodiments may comply with ISO 8583, which is a standard for systems that exchange electronic transaction information associated with a payment made by a user using a payment device or payment account. The authorization request message may include an issuer account identifier that may be associated with a payment device or payment account. An authorization request message may also comprise additional data elements corresponding to "identification information" including, by way of example only: a service code, a CVV (card verification value), a dCVV (dynamic card verification value), an expiration date, etc. An authorization request message may also comprise "transaction information," such as any information associated with a current transaction, such as the transaction amount, merchant identifier, merchant location, etc., as well as any other information that may be utilized in determining whether to identify and/or authorize a transaction. The authorization request message may also include other information such as information that identifies the access device that generated the authorization request message, information about the location of the access device, etc.

After the issuer computer 170 receives the authorization request message, the issuer computer 170 sends an authorization response message back to the payment processing network 160 to indicate whether the current transaction is authorized (or not authorized). The payment processing network 160 then forwards the authorization response message back to the acquirer computer 150. In some embodiments, payment processing network 160 may decline the transaction even if issuer computer 170 has authorized the transaction, for example depending on a value of the fraud risk score. The acquirer computer 150 then sends the response message back to the merchant computer 130.

An "authorization response message" may be an electronic message reply to an authorization request message generated by an issuing financial institution 170 or a payment processing network 160. The authorization response message may include, by way of example only, one or more of the following status indicators: Approval—transaction was approved; Decline—transaction was not approved; or Call Center—response pending more information, merchant must call the toll-free authorization phone number. The authorization response message may also include an authorization code, which may be a code that a credit card issuing bank returns in response to an authorization request message in an electronic message (either directly or through the payment processing network 160) to the merchant computer 130 that indicates approval of the transaction. The code may serve as proof of authorization. As noted above, in some embodiments, a payment processing network 160 may generate or forward the authorization response message to the merchant.

After the merchant computer 130 receives the authorization response message, the merchant computer 130 may then provide the authorization response message to the user. The response message may be displayed by the mobile device 120 or may be printed out on a physical receipt. Alternately, if the transaction is an online transaction, the merchant may provide a web page or other indication of the authorization response message as a virtual receipt. The receipts may include transaction data for the transaction.

At the end of the day, a normal clearing and settlement process can be conducted by the payment processing network 160. A clearing process is a process of exchanging financial details between an acquirer computer 150 and an issuer computer 170 to facilitate posting to a customer's payment account and reconciliation of the user's settlement position.

In the remote transaction processing system of FIG. 1, the mobile device 120 is configured to initiate and process a remote transaction with a merchant computer 130 using a merchant application 121, remote transaction application 124, and a mobile payment application 123 to provide a secure remote payment transaction environment, even when using an unknown merchant application 121 or other mobile application (e.g., web browser) installed on the mobile device 120. Note that some embodiments may include an acquirer application or other transaction processor application (instead of a merchant application 121) which may communicate with a transaction processor server computer (e.g., acquirer computer 150, merchant processor computer, etc.) to process a remote transaction.

A user (e.g., consumer 110) may operate a mobile device 120 to perform any number of functions. For example, the consumer 110 may use mobile device 120 to conduct remote payment transactions by communicating with a remote merchant server computer 130. The merchant computer 130 may deliver information regarding available products and services to the merchant application 121 which the consumer 110 may use to initiate a remote transaction, whether located at a merchant location or being remote from the merchant location.

A "mobile device" may include any electronic computing device. For example, a mobile device 120 may include a mobile phone, tablet, netbook, laptop, or any other suitable mobile computing device. The mobile device 120 may comprise a merchant application 121, a remote transaction application 124, and a mobile payment application 123. The mobile payment application 123 may be stored in a secure memory (e.g., secure element 122).

A remote transaction application 124 may include any API, application, applet, or other executable code suitable to interface between a secure application on a secure memory (e.g., a mobile payment application 123) and a merchant application 121 (and/or any other non-secure application configured to perform e-commerce transactions). For example, the remote transaction application 124 may be installed as part of general memory of the mobile device 120 but may be configured to use one or more application programming interfaces (APIs) of a secure mobile payment application 123 in order to be an intermediary for remote payment transactions initiated by the merchant application 121. Accordingly, the remote transaction application 124 may be configured to communicate with a mobile payment application 123 (e.g., Visa™ Paywave™ application) that is stored on a secure element 122 of the mobile device 120. In some embodiments, the remote transaction application 124 may be embedded in a merchant application 121 and may be used by the merchant application 121 in order to interface with a mobile payment application 123 provisioned on the secure element 122. In some embodiments, the remote transaction application 124 may be secured and embedded in the secure element 122. Additionally, in some embodiments, the remote transaction application 124 functionality could be provided by the merchant application 121 or could be embedded into an operating system of the mobile device 120. In some embodiments, the remote transaction application may include a mobile wallet or digital wallet. In some embodiments, the remote transaction application may be provided by a payment processing network or other entity associated with the mobile payment application.

The remote transaction application 124 may provide mobile payment application access control verification (e.g., provides security functions for the mobile payment application 123) by only allowing access to the mobile payment application 123 when a consumer has provided secure credentials (e.g., username, password, etc.) or otherwise been authenticated. For example, if a signature of a digital certificate cannot be validated or if a certificate is not matched with a certificate authority 140, the remote transaction application 124 may decline a request for a remote transaction from the merchant application 121 and the transaction processing may end (and the consumer may be prompted to try a different payment method or to try again). Alternatively, if the certificate is valid or if the status has not been revoked, the remote transaction application 124 may pass the request for the payment information to the mobile payment application 123.

A merchant application 121 may include any mobile program, software, or other suitable executable code suitable to conduct a payment transaction. In some embodiments, merchant application 121 may be a merchant-specific application. In other embodiments, merchant application 121 may be a general purpose application, such as a web browser. Further, merchant application 121 may be associated with parties that are not merchants and instead process payments on behalf of merchants or other service providers (e.g., payment service providers, acquirers, etc.).

A certificate authority 140 may include any computer, device, or system that is configured to issue public key certificates to transaction processors (e.g., merchants, acquirers, etc.) configured to process remote transactions. The certificate authority 140 may be configured to communicate with the mobile device 120, merchant computer 130, and/or a payment processing network 160. For example, as shown in FIG. 1, the certificate authority 140 may communicate with a merchant computer 130 to issue a signed merchant public key certificate to a merchant computer 130 configured to process remote transactions through a merchant application 121. The certificate authority 140 may receive a merchant public key during an on-boarding or other registration process for the remote transaction processing system and may securely return a signed merchant public key certificate to the merchant computer 130. The merchant public key certificate may include a merchant public key and may be signed by a certificate authority private key to allow entities within the transaction processing system to validate the authenticity of the merchant public key certificate.

The certificate authority computer 140 may be coupled to a certificate database that includes certificate status for issued certificates that may be verified by the mobile device 120, merchant computer 130, payment processing network computer 160, or any other entity in the transaction processing system. The certificate authority 140 may revoke certificates that expire, are used maliciously, are revoked by a merchant computer 130, are incorrect or unverifiable, or have any other problem. Accordingly, the certificate authority 140 may maintain and respond with a certificate status in response to a request for a status associated with a certificate.

Secure element 122 may include a hardware or software component operable to securely store any information and/or secure applications. For example, the secure element 122 may be operable to store payment information. Further, a mobile payment application 123 may be provisioned and stored on the secure element 122 to securely access personalized sensitive information (e.g., payment credentials, tokens, account identifiers, etc.) associated with a consumer's financial account. For instance, in some embodiments, secure element 122 may include a secure crypto-processor or a contactless integrated circuit to protect information stored on the secure element 122. The secure element 122 may have a separate processor, information stored thereon may be encrypted with secret keys only held by trusted service managers or other designated entities, and the secure element 122 may contain any other hardware such that the secure element 122 may be a secure area where important and/or sensitive information (e.g., payment credentials, encryption keys, and any other sensitive information) may be stored. Further, the secure data elements of the secure element 122 may only be accessed using the special secret secure element keys that only certain trusted service managers may have access to.

Figure 2:
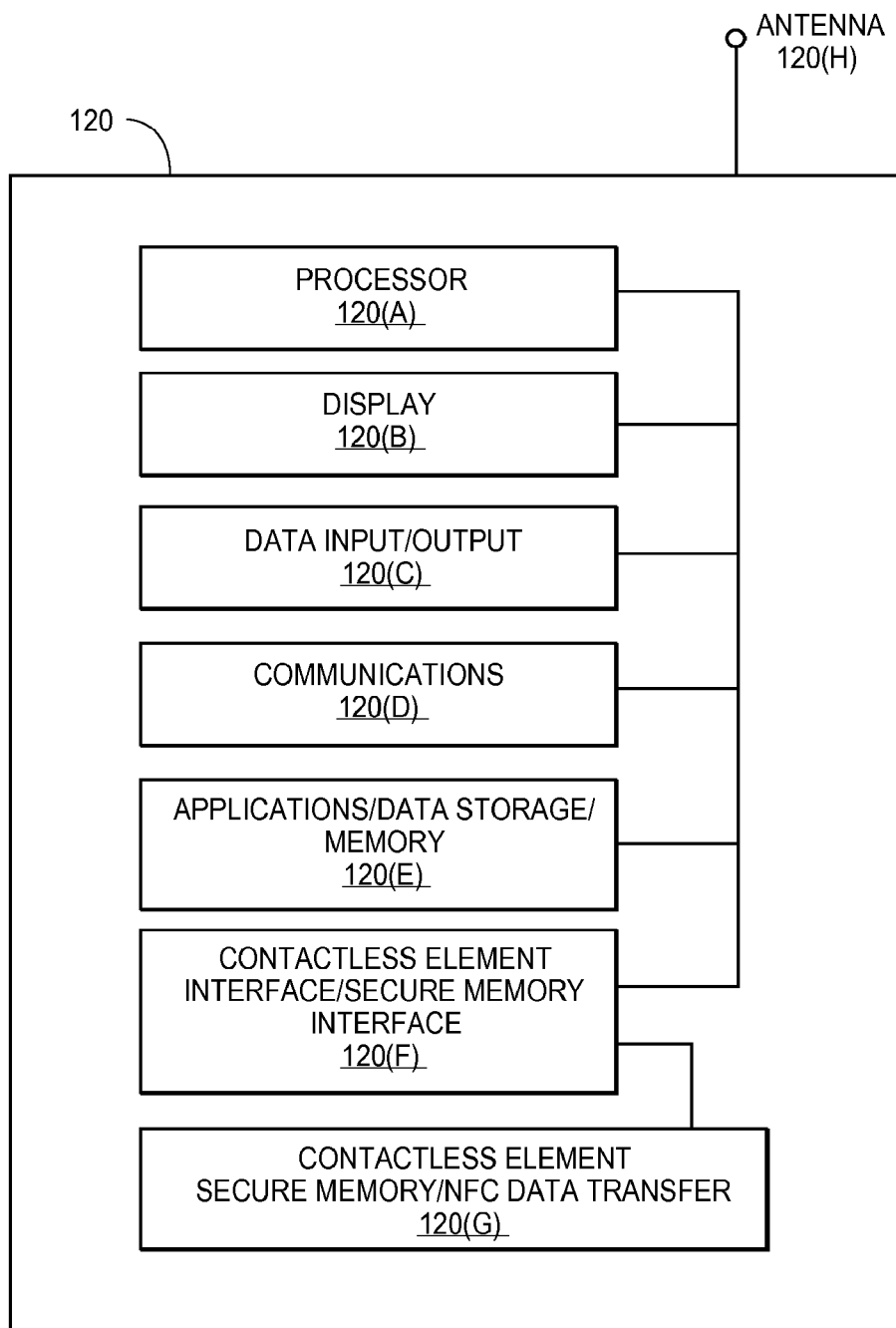
FIG. 2 shows a block diagram of an exemplary mobile device that may be used with some embodiments of the invention.

Mobile payment application 123 may include any application programming interface (API), application, applet, or other executable code suitable to retrieve payment information from a secure storage module or secure element 122. Further, the mobile payment application 123 may be configured to communicate with a remote transaction application 124 and/or merchant application 121. In some embodiments, the mobile payment application 123 may be secured such that general purpose applications may not communicate with the mobile payment application 123 or may only be provided with a specific set of commands for interacting with the mobile payment application 123. For example, mobile payment application 123 may run in the secure element 122 (as shown in FIG. 2) or other trusted environment, as a kernel service, or at a higher permission level than other applications (e.g., merchant application 121).

Mobile payment application 123 may include a certificate and/or public key associated with the certificate authority 140, which may be used to validate certificates issued and/or signed by the certificate authority 140. In some embodiments, mobile payment application 123 may be operable to generate cryptograms associated with the payment information using shared secret algorithms associated with a payment processing network 160 or issuer computer 170. For example, mobile payment application 123 may be operable to generate a dynamic card verification value (dCVV2)

associated with a payment account of an issuer computer 170. In other embodiments, the mobile payment application 123 may be capable of generating dynamic values that may be validated by a payment processing network 160 sharing a secret with the personalized mobile payment application 123.

Returning to FIG. 1, the certificate authority 140 may be associated with the merchant server computer 130 and may issue a public key certificate to the merchant computer 130 that may be used during remote payment transaction processing to establish trust the mobile payment application 123 and the merchant server computer 130, and that the merchant computer 130 is authentic and is authorized to obtain the sensitive payment credentials in the encrypted payment information. The process by which the certificate authority 140 may issue a merchant certificate is described in more detail in FIG. 4 below. Some non-limiting examples of certificate issuing methods may be found in ANSI X9.24 Part 2 *Retail Financial Services Symmetric Key Management Part 2: Using Asymmetric Techniques for the Distribution of Symmetric Keys* and ISO 11568 Part 4 *Banking—Key management (retail)—Part 4: Asymmetric cryptosystems—Key management and life cycle.*

The mobile payment application 123 may be configured to extract a public key from a received or stored public key certificate for use in processing the remote transaction. The public key may be extracted using any suitable processes. In some embodiments, the public key may be extracted before or after validation and/or verification of the public key certificate. In some embodiments, a single certificate authority root public key may be stored at the mobile payment application 123 associated with a single certificate authority 140, while in other embodiments, multiple certificate authority root keys may be stored at the mobile device 120. The certificate authority root public key may be used in a signature validation process to ensure the public key certificate is valid and active with an issuing certificate authority 140. The particular root key to use in validating a certificate may be indicated by the certificate authority 140 and the certificate being validated. For example, a merchant certificate of a first length may be validated using a first certificate authority root public key associated with the certificate authority 140 while a merchant certificate of a second length may be validated using a second certificate authority root public key associated with the certificate authority 140.

FIG. 2 shows a block diagram of an exemplary mobile device 120, according to some embodiments of the invention. The mobile device 120 may include circuitry that is used to enable certain device functions, such as telephony. The mobile device 120 may include a processor and a computer-readable medium coupled to the processor. The computer-readable medium may comprise a transaction processor application configured to process a remote payment transaction. The mobile device 120 may further comprise a secure processor and a secure computer-readable medium coupled to the secure processor. The secure computer-readable medium comprising code, executable by the secure processor, for performing a method of processing a remote transaction. The method may comprise receiving transaction data from the transaction processor application on the mobile device 120 and validating that the transaction processor application is authentic. The method may further include providing encrypted payment credentials to the transaction processor application in response to validating the transaction processor application. The transaction processor application may initiate a payment transaction with a transaction processor server computer using the encrypted payment credentials.

The functional elements responsible for enabling those functions may include a processor 120(A) that is programmed to execute instructions that implement the functions and operations of the device. The processor 120(A) may access data storage 120(E) (or another suitable memory region or element) to retrieve instructions or data used in executing the instructions, such as a merchant application 121, remote transaction application 124, or other mobile applications. Data input/output elements 120(C), such as a keyboard or touchscreen, may be used to enable a user to operate the mobile device 120 and input data (e.g., user authentication data). Data input/output elements 120(C) may also be configured to output data (via a speaker, for example). Display 120(B) may also be used to output data to a user. Communications element 120(D) may be used to enable data transfer between mobile device 120 and a wired or wireless network (via antenna 120(H), for example) to assist in connectivity to the Internet or other communications network, and enabling data transfer functions.

Mobile device 120 may also include a contactless element interface or secure memory interface 120(F) to enable data transfer between contactless element 120(G) and other elements of the device, where contactless element 120(G) may include a secure memory (e.g., a secure element 122) and a near field communications data transfer element (or another form of short range or contactless communications technology). As noted, a cellular phone or similar device is an example of a mobile device 120 that may be used in accordance with embodiments of the present invention. However, other forms or types of devices may be used without departing from the underlying concepts of the invention. Further, devices may not require the capability to communicate using a cellular network in order to be suitable for use with embodiments of the present invention.

A. Merchant Certificate Issuance/Provisioning Methods

Figure 3:
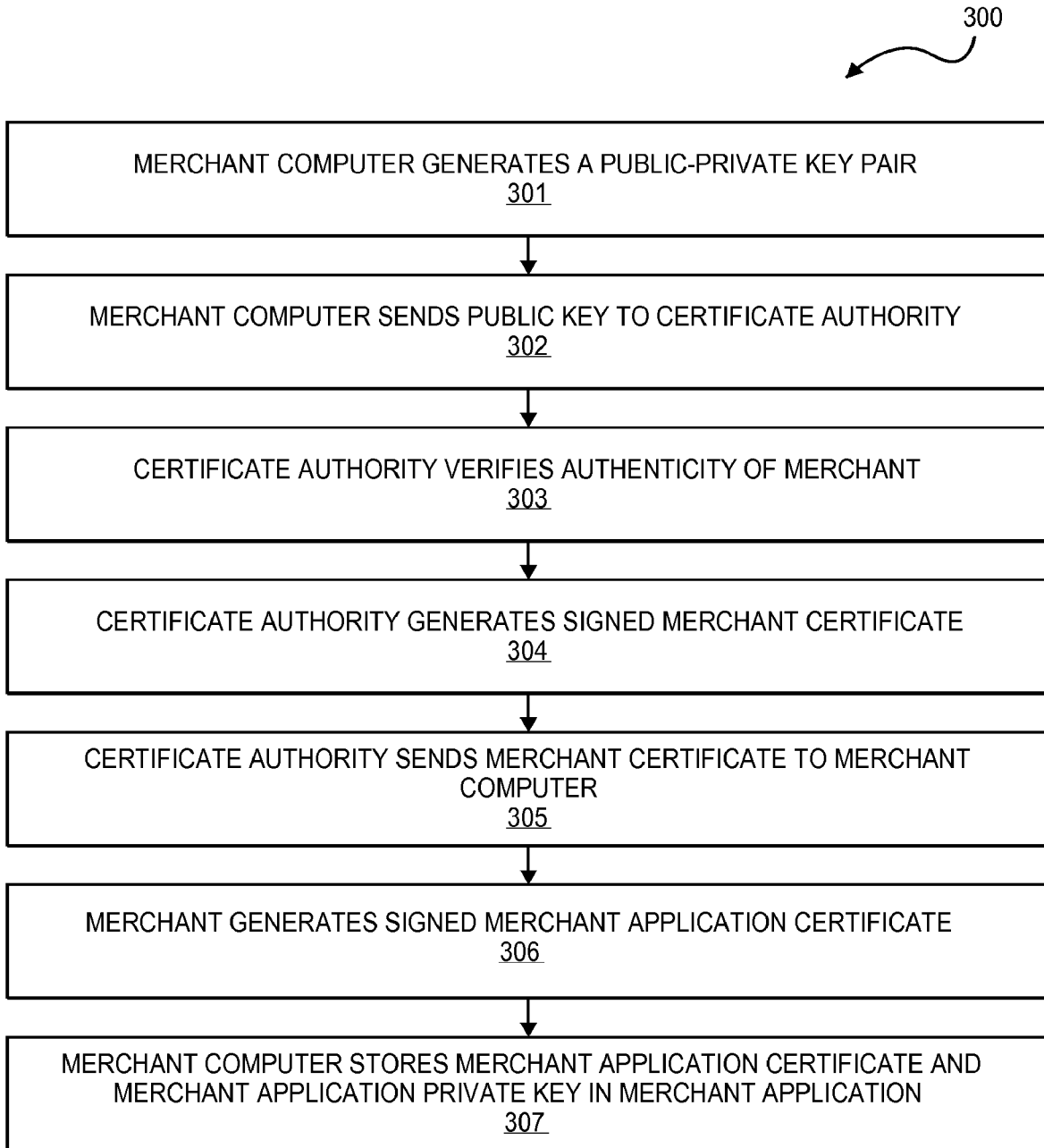
FIG. 3 shows a flow diagram of an exemplary method for provisioning merchant public/private key pairs and merchant application certificates using a certificate authority, according to some embodiments of the invention.

FIG. 3 shows a flow diagram of an exemplary method 300 for provisioning merchant public/private key pairs and merchant certificates using a certificate authority 140, according to some embodiments of the invention. In some embodiments, method 300 may be performed in order to provide a merchant computer 130 with a certificate indicating the merchant's trustworthiness or authenticity. Subsequently, the received merchant certificate may be included in merchant applications installed on or provided to mobile devices. These merchant certificates may be referred to as merchant application certificates.

At step 301, a merchant computer 130 generates a merchant public-private key pair. The merchant public-private key pair may be generated in any suitable format such as RSA or elliptical curve cryptography (ECC). In some embodiments, a merchant private key may be stored securely on a merchant computer 130.

At step 302, the merchant computer 130 sends the merchant public key of the public-private key pair to a certificate authority 140. The certificate authority 140 may include any suitable entity configured to issue and validate a certificate. For example, in some embodiments, the certificate authority 140 may include a payment processing network 160, a mobile wallet provider, an entity that is not included in the typical payment transaction processing system, or any other entity.

At step 303, the certificate authority 140 verifies the authenticity of the merchant using any suitable means. For example, merchant computer 130 may provide the certificate authority 140 with information providing the identity of the merchant computer 130 as being operated by the merchant. In one example, merchant computer 130 may provide a document signed by an authorized signatory of a merchant (e.g., the merchant organization's president). In some embodiments, the certificate authority 140 may provide an on-boarding or registration process through which the merchant (or other certificate recipient) may register for a merchant certificate and for use of the remote payment transaction system described herein.

At step 304, certificate authority 140 generates a signed merchant certificate using the received merchant certificate signing request which includes the merchant public key. Typically, the merchant certificate may be signed by the certificate authority root private key. The certificate authority signature allows an entity to validate the authenticity of the merchant certificate using a certificate authority root public key. The certificate authority root public key may be provided to multiple entities involved with the transaction processing system to allow for validation of the merchant public key certificate during transaction processing.

At step 305, certificate authority 140 sends the signed merchant certificate to the merchant computer 130. The signed merchant certificate may include the merchant public key, a certificate identifier (e.g., serial number), a certificate authority identifier, the legal name of the merchant, a valid-from and valid-to date for the certificate, certificate-related permissions, or any other relevant information to identify and/or authenticate an entity or the certificate itself.

At step 306, merchant computer 130 generates a signed merchant application certificate using the merchant private key. Thus, a chain of trust may be established from the merchant application certificate, to the merchant certificate, to the certificate authority root certificate. In some embodiments, the signed merchant application certificate may be associated with an instance or version of a merchant application 121. For example, the merchant application certificate may be used to verify that the merchant application 121 is from the merchant. Thereafter, the merchant application certificate may be validated using a merchant public key.

At step 307, merchant computer 130 stores the merchant application certificate and a merchant application private key associated with the merchant application certificate in a merchant application 121. Thus, when the merchant application 121 is loaded onto a mobile device 120, the authenticity of the merchant application 121 may be verified.

In some embodiments, the merchant application certificate and the private key associated with the merchant application certificate may be stored at the merchant computer 130. Accordingly, in some embodiments, the certificate may be passed to the merchant application 121 during transaction processing to validate the identity of the merchant computer 130. Further, in some embodiments, a merchant certificate provided by the certificate authority 140 may be provided to the merchant application 121 during a transaction to allow for validation of the merchant server computer 130 associated with the transaction. Thus, in some embodiments, the merchant certificate may be used and provisioned into a merchant application 121 instead of a merchant application certificate. Accordingly, the merchant certificate may be provisioned onto the merchant application 121 and all data may be passed to the merchant computer 130 which stores the merchant private key associated with the merchant certificate provisioned to the merchant application 121. This embodiment is discussed in further detail below in reference to FIGS. 5A-5C.

It should be understood that FIG. 3 is intended to be descriptive and non-limiting. For example, in some embodiments of the invention, the merchant public-private key pair may be generated by the certificate authority 140, and the merchant private key may be provided to the merchant computer 130 securely, for example using a Public-Key Cryptography Standards (PKCS) #12 message. Additionally, in some embodiments and as described in more detail below in reference to FIGS. 5A-5C, the merchant application certificate (also referred to as a merchant certificate) may be provided by a merchant computer 130 during a transaction in response to an indication of remote transaction processing.

Figure 4:
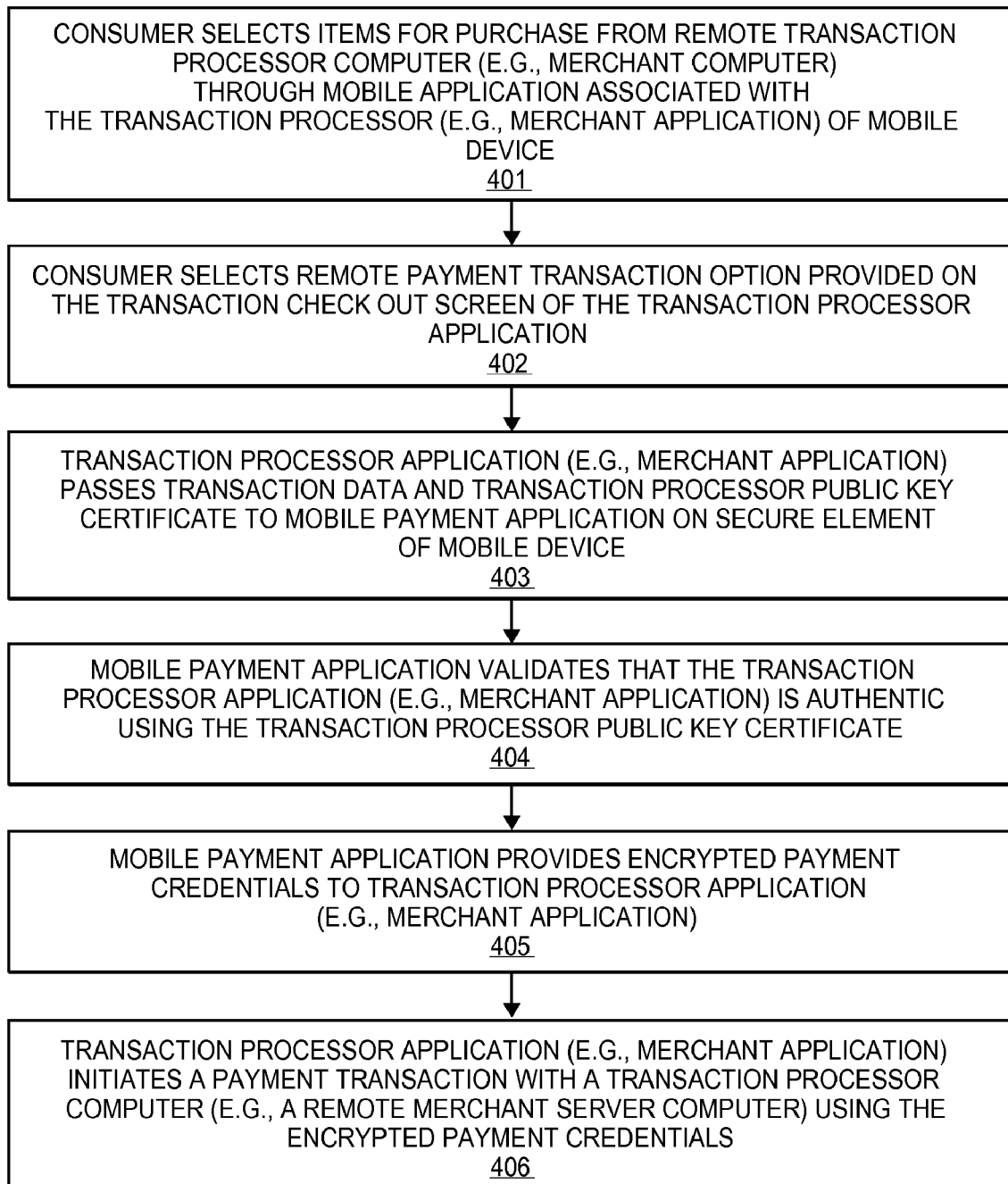
FIG. 4 shows a flow diagram of an exemplary method for processing a remote transaction using a transaction processor application of a mobile device, according to some embodiments of the invention.

B. Exemplary Methods for Secure Remote Payment Transaction Processing Using a Secure Element FIG. 4 shows a flow diagram of an exemplary method 400 for securely processing a remote transaction using a transaction processor application (e.g., merchant application 121) of a mobile device 120, according to some embodiments of the invention. In some embodiments, the method of FIG. 4 may be performed after a transaction processor public encryption key certificate has been provisioned (e.g., in accordance with method 400) and stored in the transaction processor application (e.g., merchant application 121) of the mobile device 120 with or without the transaction processor private key (e.g., merchant private key). Subsequently, the method of FIG. 5 may be performed in order to conduct a remote payment transaction for goods or services through the transaction processor application (e.g., merchant application 121, acquirer application, etc.).

At step 401, a consumer selects items for purchase received from a remote transaction processor computer (e.g., merchant server computer 130) through a mobile application associated with the transaction processor (e.g., merchant application 121) of the mobile device 120.

At step 402, the consumer selects the remote payment transaction option provided on a transaction payment checkout screen of the transaction processor application (e.g., merchant application 121).

At step 403, the transaction processor application (e.g., merchant application 121) passes transaction data and previously provisioned transaction processor public key certificate (e.g., merchant public key certificate or merchant application public key certificate) to mobile payment application 123 on secure element 122 of mobile device 120.

At step 404, the mobile payment application 123 validates that the transaction processor application (e.g., merchant application 121) is authentic using the received transaction processor public key certificate (e.g., merchant public key certificate). As described above, a variety of validation processes may be completed to ensure the transaction processor application (e.g., merchant application 121) is authentic. For example, the mobile payment application 123 may apply a certificate authority public key to the received transaction processor public key certificate to validate that the transaction processor public key certificate is signed by a certificate authority 140. If the signed public key certificate is validated using the certificate authority 140, the transaction processor public key certificate may be determined to be authentic as it was signed by a trusted certificate authority 140.

Additionally, in some embodiments, the mobile payment application 123 may verify that the transaction processor certificate is currently valid with a certificate authority 140 by sending a validation request to the certificate authority 140. For example, the mobile payment application 123 may communicate with a certificate authority 140 to ensure that the public certificate is currently valid and in good standing (e.g., has not been reported, via certificate revocation lists (CRLs) or online certificate status protocol responders (CSPRs) or the like, as compromised or revoked). For instance, the mobile payment application 123 may send the public key certificate identifier to the certificate authority 140 or to another provider (e.g., certificate revocation list manager) to determine the status of the certificate.

Further, in some embodiments, if the mobile payment application 123 (or a remote transaction application 124) determines that the transaction processor certificate is not currently valid with the certificate authority 140, the mobile payment application 123 may update the transaction processor certificate with the certificate authority 140 and receive an updated merchant certificate for processing the remote transaction. Accordingly, the remote transaction may continue based on the update public certificate received from the certificate authority 140.

At step 405, the mobile payment application 123 provides encrypted payment credentials to transaction processor application (e.g., merchant application 121). In some embodiments, the mobile payment application 123 may provide the encrypted payment credentials in response to validating the transaction processor application as being authentic. The mobile payment application 123 may also provide transaction data and other account and/or transaction related information as encrypted payment information. For example, the payment information may include payment credentials (e.g., account identifier, expiration date, etc.), transaction data (e.g., transaction total, product information, etc.), merchant information (e.g., merchant identifier), and any other relevant information. Additionally, the mobile payment application 123 may generate a dynamic value using a shared algorithm associated with a payment processing network 160 or an issuer computer 170. The dynamic value may be included in the payment information and may be validated by the payment processing network 160 or the issuer computer 170 during transaction processing.

Additionally, in some embodiments, the mobile payment application 123 may provide the encrypted payment credentials by extracting a transaction processor public key from the transaction processor certificate, determining payment credentials stored in the secure memory associated with the transaction data, and encrypting the payment credentials using the extracted transaction processor public key.

The mobile payment application 123 may determine the payment credentials for the transaction through any suitable method including receiving a consumer identifier associated with the remote transaction application 124 that the consumer may have logged into while shopping, checking out of the merchant application 121, or during the remote transaction processing steps. Accordingly, the transaction data included in the request for payment credentials received from the merchant application 121 and/or remote transaction application 124 may include transaction data that may include a consumer identifier, a mobile wallet identifier, account credential identifiers, or other identifier for determining the appropriate consumer account credentials stored in the secure element 122 for the transaction. For instance, during check out, once a consumer selects a remote transaction, the merchant application 121 or the remote transaction application 124 may determine the available accounts and request selection of an account by the consumer. Further, the mobile payment application 123 may request the consumer indicate the appropriate account during transaction processing. Alternatively or in combination, a default account may be associated with the remote transaction application 124, the transaction processor application, or the mobile payment application 123 for remote transactions.

At step 406, the transaction processor application (e.g., merchant application 121) initiates a payment transaction with a transaction processor computer (e.g., a remote merchant server computer 130) using the encrypted payment credentials. The transaction processor application may initiate a payment transaction through any suitable method. For example, in some embodiments, the transaction processor application initiates remote transaction processing by sending the encrypted payment credentials and the transaction data to the transaction processor server computer. Accordingly, the transaction processor server computer may decrypt the payment credentials using a transaction processor private key and generate an authorization request message using the decrypted payment credentials. The transaction processor server computer may generate the authorization request message by mapping the decrypted payment information to an authorization request message configured to be processed by a payment processing network 160.

In some embodiments, the transaction processor application may initiate the payment transaction by decrypting the payment credentials using a transaction processor application private key, generating an authorization request message including the decrypted payment credentials, and sending the authorization request message to the transaction processor server computer.

Figure 5A:
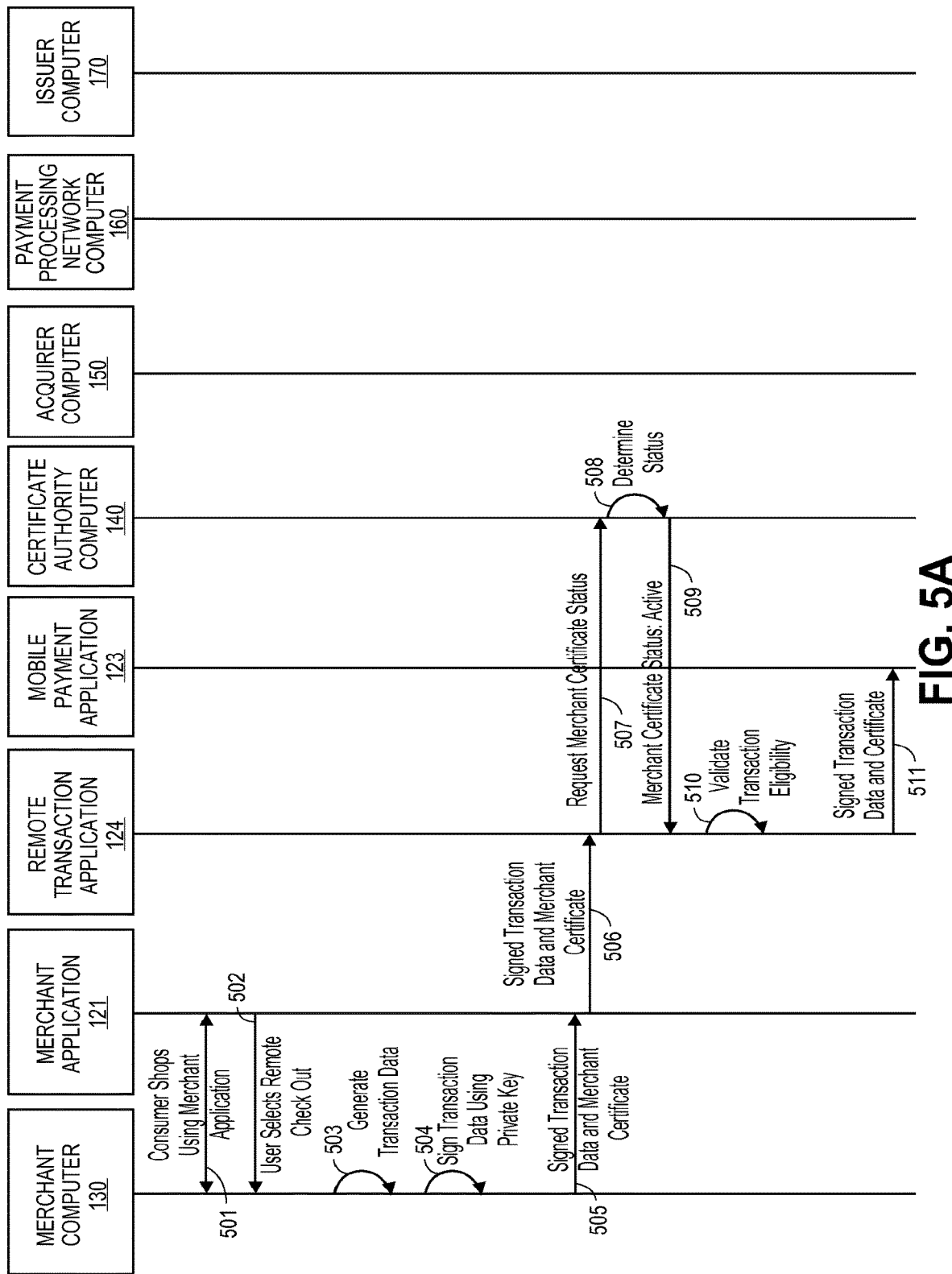
FIGS. 5A-5C show a flow diagram of an exemplary method for processing a remote transaction using a merchant application of a mobile device, according to some embodiments of the invention.
Figure 5B:
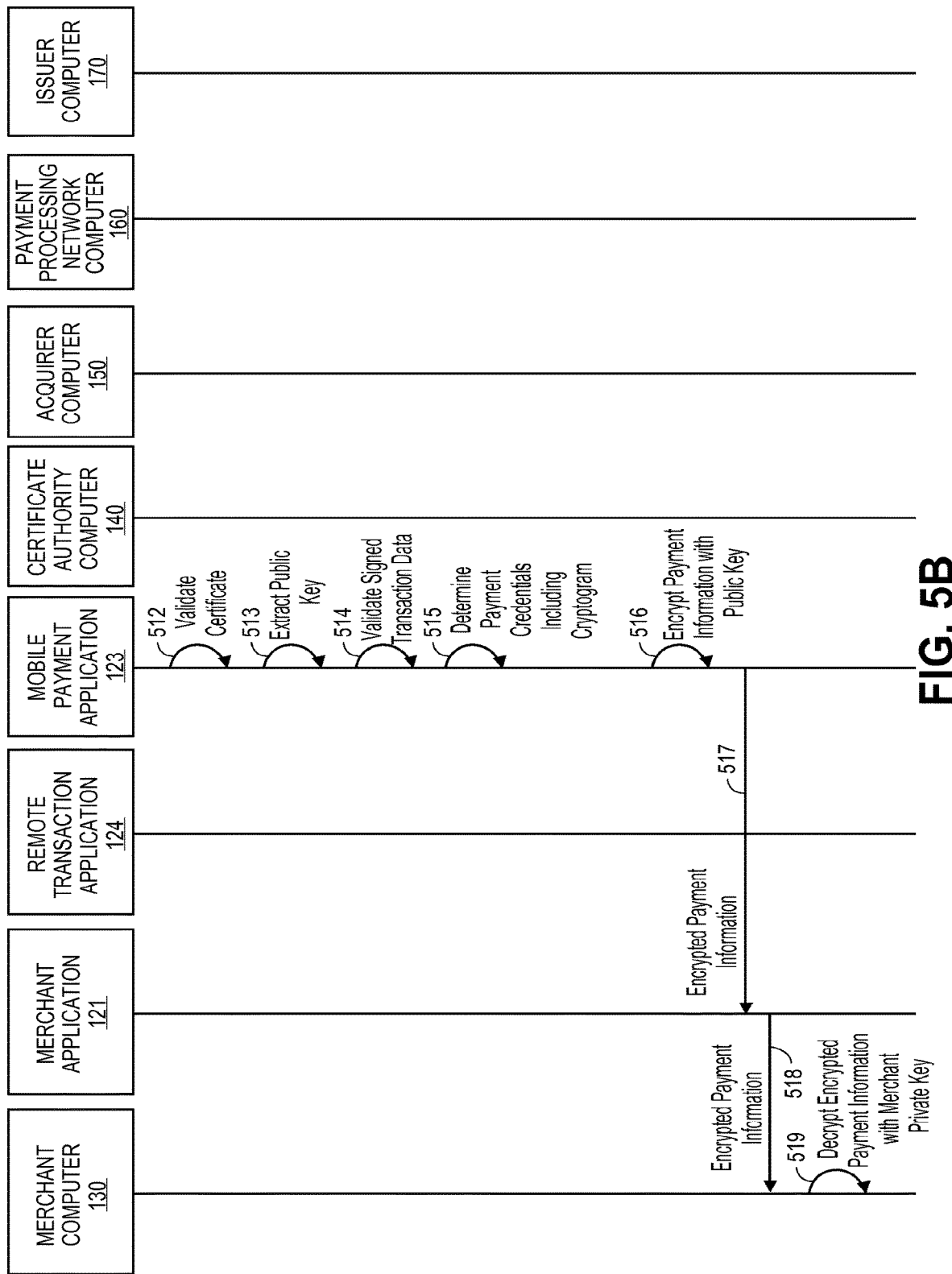
Figure 5C:
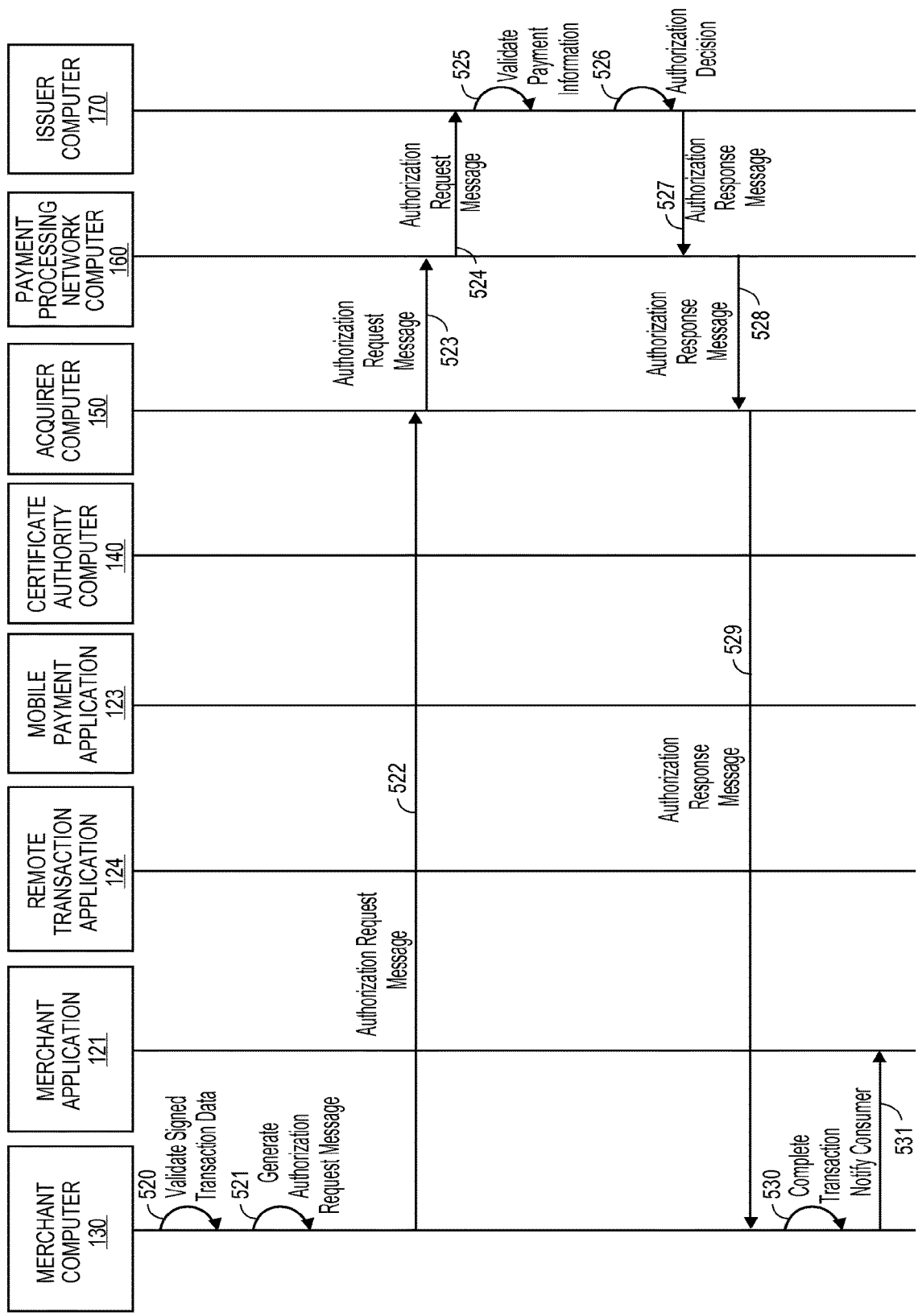

FIGS. 5A-5C show an exemplary flow diagram for an exemplary implementation of the secure remote transaction processing system, according to one embodiment. In the example provided in FIGS. 5A-5C, the transaction processor application includes a merchant application 121 and the transaction processor computer includes a remote merchant server computer 130. However, note that in some embodiments, the transaction processor could include an acquirer computer 150 associated with a merchant, a payment gateway (not shown), a merchant processor (not shown), or any other third party associated with a merchant, service provider, or payee. Note that is such embodiments, the transaction processor application is associated with the transaction processor server computer which may provide purchasing information and host payment services on behalf of a merchant or a group of merchants, service providers, etc.

At step 501, a consumer finishes their shopping experience through a merchant application 121 that communicates with a merchant online or e-commerce server computer. When the consumer is prepared to checkout of their shopping experience and complete the purchase, the consumer may log into a third party applet or remote transaction application 124 or service layer present on the mobile device 120 using a third party (e.g., mobile wallet provider) credential. In some embodiments, the consumer may have already logged into the mobile wallet or may have a default mobile wallet or account in which to perform a transaction.

At step 502, the consumer initiates a remote transaction payment checkout through the merchant application 121 by selecting an available option for a remote check out or remote payment transaction. The merchant application 121 may determine that remote transactions are available based on the availability and/or status of the mobile payment application 123, the profile of the consumer once logged into the mobile wallet, or may provide a remote payment transaction checkout option for all transactions. Once the consumer selects the remote check out option, the merchant application 121 may request transaction data from the merchant computer 130. In some embodiments, the merchant computer 130 may have already provided this information to the merchant application 121. However, in the embodiment shown in FIGS. 5A-5C, the merchant application 121 may inform the merchant computer 130 that a remote payment transaction has been initiated.

At step 503, the merchant computer 130 may generate transaction data for the transaction. The transaction data may include any relevant information for the transaction including transaction amount, date and time, a merchant identifier associated with the payee, consumer identification information (e.g., username, consumer identifier, etc.), and any other relevant information for initiating and processing a remote payment transaction.

At step 504, the merchant computer 130 may sign the generated transaction data using a merchant private key of the merchant private-public key pair. As described in relation to FIG. 3, the merchant private-public key pair may be generated by a certificate authority 140 before transaction processing and the private key may be returned to the merchant computer 130 and stored securely for use in remote transaction processing.

At step 505, the merchant computer 130 may send the signed transaction data and a merchant public key certificate stored at the merchant computer 130 to the merchant application 121 of the mobile device 120. In some embodiments, the merchant public key certificate may be present or installed into the merchant application 121 and may be merely combined with the transaction data by the merchant application 121. The merchant certificate may be signed by a certificate authority 140 associated with the remote transaction processing system and the mobile payment application 123 may have access to the public root key of the certificate authority 140 for validation of the merchant certificate.

At step 506, the merchant application 121 sends the signed transaction data and the merchant public key certificate to the remote transaction application 124. In some embodiments, the merchant application 121 may provide an option to select a payment card or account for payment through a remote transaction application 124. The consumer may select an account in order to initiate payment.

At step 507, the remote transaction application 124 requests a merchant certificate status from a certificate authority computer 140.

At step 508, the certificate authority computer 140 may determine the status of the merchant certificate. The certificate authority computer 140 may determine the status through any suitable manner. For example, the request for merchant certificate status may include a serial number or other certificate identifier of the merchant certificate that may allow the certificate authority computer 140 to search a certificate database for the status associated with the merchant certificate identifier.

At step 509, the certificate authority computer 140 generates and sends a merchant certificate response to the remote transaction application 124. The response may include the status of the merchant certificate (e.g., active, suspended, revoked, etc.).

At step 510, the remote transaction application 124 may validate the transaction eligibility of the transaction data to determine whether the access should be provided to the mobile payment application 123. The remote transaction application 124 may perform any suitable eligibility checks to determine whether the transaction is eligible including validating the merchant identifier is configured and/or registered for remote transaction processing, that the transaction data is complete and includes all necessary information for performing the transaction, that the merchant certificate is in good standing, that the transaction is not over a threshold amount, that the merchant identifier for the transaction is associated with the merchant certificate (i.e., that the merchant certificate matches the merchant generating the transaction data), or any other relevant transaction data eligibility checks.

At step 511, if the remote transaction application 124 determines that the transaction is eligible for remote transaction processing, the remote transaction application 124 communicates the transaction data and the merchant certificate to a mobile payment application 123 residing on the secure element 122. The remote transaction application 124 may use APIs or other commands to request that the mobile payment application 123 (e.g., Visa™ Paywave™ application) provide provisioned payment credentials (e.g., a payment token, primary account number (PAN), pseudo-PAN, Ghost PAN, expiration date, etc.) that are stored on the secure element 122 in a secured manner.

The payment information request sent to the mobile payment application 123 may include consumer credential identifier information that is suitable to identify a consumer account (e.g., payment credentials associated with the mobile payment application 123), a type of transaction (e.g., a remote transaction), and any other information that may be relevant to the mobile payment application 123 for processing the remote payment transaction. For example, the request may include a consumer's name, a payment processing network identifier associated with the payment method (e.g., Visa™, MasterCard™, etc.), and the last four digits an account number in order for the mobile payment application 123 to identify payment credentials or account information in which to use for the remote payment transaction.

At step 512, the mobile payment application 123 validates the merchant certificate using a stored certificate authority public key associated with the merchant public key certificate. In some embodiments, more than one certificate authority public key may be stored and/or accessible by the mobile payment application 123. For example, different certificate authority public keys (and private keys) may be used to validate (and sign) merchant certificates of different lengths. Further, where the mobile payment application 123 is configured to process transactions using public-private key pairs signed by different certificate authorities, different certificate authority public keys may be identified and used to validate the merchant certificate associated with each certificate authority 140. Accordingly, the mobile payment application 123 may determine the appropriate certificate authority public key from the merchant certificate information (e.g., serial number, certificate authority information, etc.) and may select the appropriate certificate authority public key for validating the merchant certificate by matching stored certificate authority public keys with the certificate authority information in the merchant certificate.

At step 513, if the merchant public key certificate is validated, the mobile payment application 123 extracts the public key from the merchant public key certificate.

At step 514, the mobile payment application 123 validates the signed transaction data using the extracted merchant public key from the merchant certificate. Accordingly, the mobile payment application 123 may determine whether the merchant server computer 130 associated with the merchant certificate generated and signed the transaction data. Therefore, the mobile payment application 123 may validate the merchant certificate is provided by a certificate authority 140, is currently valid, and that the transaction data was provided by the appropriate merchant computer 130 with access to the merchant private key corresponding to the merchant public key in the merchant certificate. Accordingly, the mobile payment application 123 may be confident regarding the authenticity and security of the merchant application 121 as being associated with the appropriate merchant server computer 130.

At step 515, the mobile payment application 123 retrieves payment credentials from the secure element 122 of the mobile device 120 and generates any payment information that is not stored for in the secure element 122. For example, the mobile payment application 123 may receive a consumer identifier or account credential identifier associated with a consumer account identifier stored in the secure element 122 and may be determine the account identifier and the expiration data associated with the received consumer identifier or consumer account credential identifier. However, the dynamic value (i.e., cryptogram) and/or other transaction dependent information (e.g., liability indicator) may not be present in the secure element 122 or may need to be generated based on the transaction data. Accordingly, the mobile payment application 123 may generate and/or determine the payment information for the transaction. For example, the payment information may include payment card data (e.g., a payment account number (PAN) and expiration date), a cryptogram (such as a dynamic card verification value (dCVV or dCVV2), or other dynamically generated data), and/or any other information suitable to conduct a remote payment transaction.

At step 516, the mobile payment application 123 encrypts the payment information using the extracted merchant public key associated with the merchant certificate.

At step 517, the mobile payment application 123 sends the encrypted payment information to the merchant application 121. It should be noted that in the embodiment shown in FIG. 5, because the merchant private key is not known by the merchant application 121, the encrypted payment information cannot be deciphered by the merchant application 121. Further, the encrypted payment information may include any relevant information to identify the transaction and inform the mobile payment application 123 (or the remote transaction application 124) as to which merchant application 121 in which to send the encrypted payment information.

At step 518, the merchant application 121 receives the encrypted payment information and sends the encrypted payment information to the merchant computer 130. The merchant application 121 may determine the appropriate merchant computer 130 in which to send the encrypted payment information through any suitable method. For example, routing information may be included in the payment response, the merchant application 121 may have a destination merchant computer 130 associated with the remote payment transaction when the payment is initiated, or the merchant application 121 may have a designated merchant computer 130 in which to send the payment response.

Any number of different methods may be used to send the encrypted payment information to the merchant computer 130. For example, the encrypted payment information may include unencrypted routing information associated with the merchant computer 130 such that the merchant application 121 may automatically route the encrypted payment information to the merchant computer 130. Alternatively or in combination, the merchant application 121 may have the routing information (e.g., server computer address) associated with merchant computer 130 programmed into the merchant application 121 and when the transaction is initiated, the merchant application 121 may know that any respective payment response message may be routed to the merchant computer 130. Further, a flag or other data element (e.g., merchant identifier) in a message received including the encrypted payment information may indicate to the merchant application 121 as to where and in which entity to send the encrypted payment information.

Additionally, in some embodiments, the mobile payment application 123 may be configured to send the encrypted payment information directly to the merchant computer 130. Accordingly, the mobile payment application 123 may use address information included in the merchant certificate or merchant information provided in the transaction data to determine the appropriate merchant server computer 130 in which to send the purchase response directly.

At step 519, the merchant computer 130 receives the encrypted payment information and decrypts the encrypted payment information using the merchant private key stored at the merchant computer 130. Thus, the merchant computer 130 may gain access to the payment information (e.g., payment credentials and/or other secure information) that the mobile payment application 123 obtained and encrypted from the secure memory of the mobile communication device. For example, the merchant server may obtain an account identifier (e.g., a primary account number (PAN)), an expiration date associated with a payment account, a transaction specific cryptogram or dynamic value, a security level, a liability indicator, transaction data, and any other relevant information to initiating a payment transaction. The cryptogram provides additional authentication and validation opportunities for the payment processing network 160 and/or issuer computer 170 and allows for minimized risk of fraud in such remote transactions.

At step 520, the merchant computer 130 may validate the signed transaction data to ensure the transaction data was not altered, modified, and/or switched during transaction processing. The merchant computer 130 may determine the transaction information (e.g., transaction total, time, date, merchant identifier, etc.) and may recreate a signature of the transaction data using the merchant private key and may compare the generated signed transaction data with the received signed transaction data. As such, the merchant computer 130 may validate that the transaction data provided before encryption by the mobile payment application 123 has not been altered during the transaction processing.

At step 521, the merchant computer 130 may use the decrypted payment information to initiate a payment transaction. For example, merchant computer 130 may generate an authorization request message using the decrypted payment information and the authorization request message may include information that would typically be present in card-present transactions (e.g., payment credentials, dynamic chip data (i.e., cryptogram), etc.). Accordingly, the merchant computer 130 may map the decrypted payment information (as well as the other transaction information included in the payment information) to the format associated with an authorization request message of the merchant computer 130, acquirer computer 150, payment processing network 160, and issuer computer 170. Accordingly, the merchant computer 130 may map the decrypted payment information to predetermined fields within the authorization request message in order to allow transaction entities within the transaction ecosystem to identify an account, an authentication level, and process the transaction as if the transaction occurred in person or through a near-field communication or other proximity based transaction using the mobile payment application 123.

At step 522, the merchant computer 130 may send the authorization request message to an acquirer computer 150 associated with the merchant computer 130 for processing of the transaction. As with any of the communications described herein, the authorization request message may be sent along a secure communication channel using an encrypted link encryption key or encryption process. Accordingly, in some embodiments, the payment information included in the authorization request message may be encrypted an additional time and sent to the acquirer computer 150 for processing. Any other secure process may be used to send the authorization request message to the acquirer computer 150 through a secure process.

At step 523, the acquirer computer 150 may route the authorization request message to a payment processing network 160 associated with the issuer identifier (e.g., a BIN) or account identifier (e.g., primary account identifier) provided in the authorization request message. The payment processing network 160 may be configured to process the payment transaction as if the payment transaction were a card present or other local transaction.

In some embodiments, the payment processing network 160 may not be aware that the payment transaction is a remote payment transaction because the authorization request message may have the same secure data fields that other chip based card present transactions would have. Accordingly, the remote payment transaction may have the same security features and risks associated with card present transactions which may lead to fewer fraudulent transactions.

In some embodiments, the payment processing network 160 may determine that the authorization request message is associated with a remote payment transaction based on the type of cryptogram or dynamic data generated by the mobile payment application 123 or by a security level indicator provided in the payment information or authorization request message. For example, the mobile payment application 123, the merchant application 121, or the merchant computer 130 may provide a security level indicator that informs the payment network as well as issuers that the transaction originated remotely but was processed through the secure remote payment transaction processing method described herein. In such embodiments, there may be different security level indicators for a traditional key entered or non-secure card-not-present transaction. Accordingly, the security level indicator may inform the various entities as to who is liable for fraud in a payment transaction (e.g., a merchant, an issuer, remote transaction application provider, payment processing network 160, etc.) as well as the risks associated with such transaction types.

In some embodiments, the payment processing network 160 may be configured to perform transactions using tokens, pseudo-PANs, or any other account substitute. In such embodiments, the payment credentials may include an account substitute and the payment processing network 160 may determine and identify a corresponding account identifier in the authorization request message. Accordingly, the payment processing network 160 may modify the authorization request message to include the account identifier associated with the received payment credentials (e.g., token) and may incorporate any other information that may be used to process the transaction by a corresponding issuer computer 170.

At step 524, the payment processing network 160 may forward the authorization request message to an issuer computer 170 associated with the consumer account identified in the authorization request message for the remote payment transaction.

At step 525, the issuer computer 170 may validate the dynamic value (e.g., cryptogram) in the authorization request message. The issuer computer 170 may parse the authorization request message to determine the cryptogram or other dynamic verification value and may access the issuer key used to generate the cryptogram in order to generate a validation authentication value. If the validation authentication value and the dynamic value match, the issuer computer 170 may know that the transaction was generated by a legitimate device and determine that the likelihood that this transaction is fraudulent is low. Accordingly, the issuer computer 170 may use the validation result when determining the risk level and authorization decision for the transaction. Therefore, an issuer may use the validation result to know that the transaction is likely authentic and should be authorized.

At step 526, the issuer computer 170 may perform a risk assessment and authorization decision process where the issuer computer 170 may use the relevant information from the authorization request message including any validation information from the payment processing network 160 related to the transaction (e.g., a risk score, results of other authentication processes, etc.) and may make a decision regarding whether the transaction is authorized.

At step 527, the issuer computer 170 may generate and send an authorization response message including an indication as to whether the transaction is authorized back through the payment processing network 160.

At step 528, the payment processing network computer 160 forwards the authorization response message to the acquirer computer 150.

At step 529, the acquirer computer 150 forwards the authorization response message to the merchant computer 130.

At step 530, the merchant computer 130 may determine that the transaction is completed and may perform any necessary steps to complete the transaction including delivering products, scheduling services, or any other relevant steps to complete the transaction.

At step 531, the merchant computer 130 forwards the result of the authorization response message to the merchant application 121 in order to notify the consumer 110 as to whether the transaction is authorized and is successfully completed.

It should be understood that the exemplary flow diagram of FIGS. 5A-5C is intended to be descriptive and non-limiting. For example, any number of different entities may be used to decrypt the encrypted payment information. For instance, in some embodiments, a merchant application 121, an acquirer application, or any other relevant party may be used for decrypting and passing payment information to a corresponding remote computer. Other transaction entities may also be configured to decrypt the encrypted payment information and initiate a payment transaction.

For instance, instead of using a merchant public key to encrypt the payment information, a merchant application public key (associated with a private key stored at the merchant application 121) or an acquirer public key (associated with a private key stored at an acquirer computer 150) may be used to encrypt the payment information and the encrypted payment information may be passed to each respective entity (e.g., merchant application 121 or acquirer computer 150) for decrypting and generation of an authorization request message.

In such embodiments, depending on the configuration of the remote transaction processing system, any number of transaction processor public key certificates (e.g., merchant application public key certificate, merchant public key certificate, acquirer public key certificate, etc.) may be passed to the mobile payment application 123. The merchant application 121 may then extract and use the public key associated with each transaction processor entity (e.g., merchant application 121, merchant computer 130, acquirer computer 150, payment gateway, etc.) to encrypt the payment information with the associated extracted transaction processor public key. The mobile payment application 123 may then send the encrypted payment information to a transaction processing entity (e.g., a merchant application 121, merchant computer 130, acquirer computer 150, etc.) associated with the received public key certificate (and subsequently the public key extracted and used to encrypt the payment information).

For example, where the public key certificate includes a merchant application public key certificate, the mobile payment application 123 may extract the merchant application public key and use it to encrypt the payment information and send the encrypted payment information to the merchant application 121. The merchant application 121 may then use a stored merchant application private key to decrypt the encrypted payment information using the merchant application private key. Accordingly, the merchant application 121 may have access to the sensitive information that was stored on the secure element 122 as well as secure information that was generated using the secure algorithms of the mobile payment application 123 for the payment transaction. The merchant application 121 may then initiate a payment transaction using the decrypted payment information. For example, the merchant application 121 may generate an authorization request message configured to be sent through a payment processing network 160. Alternatively, the merchant application 121 may encrypt the decrypted payment information again using a merchant server key and may send the payment information to the merchant computer 130 for decryption and initiation of the payment transaction. As such, the decrypted payment information may be passed to a merchant computer 130 for generation of an authorization request message or other initiation of a payment transaction.

Additionally, where the public key certificate includes an acquirer public key certificate, the mobile payment application 123 may use the extracted acquirer public key to encrypt the payment information and send the encrypted payment information to the acquirer computer 150. Similar processes to those described above regarding sending the merchant public key encrypted payment information may be used to send the encrypted payment information to the acquirer computer 150 including either routing the information through the merchant application 121 and merchant computer 130 or directly sending the encrypted payment information to the acquirer computer 150. The acquirer computer 150 may then decrypt the encrypted payment information, initiate a payment transaction, and send an authorization request message to a payment processing network 160 above.

Accordingly, there are many options for securely processing the remote payment transaction in order to pass sensitive information from a mobile payment application 123 of a mobile device 120 to a remote server computer without allowing the sensitive information to be intercepted by malicious third parties and while providing the security benefits of card-present or local transactions while completing a remote payment transaction.

II. Exemplary Computer Apparatus

Figure 6:
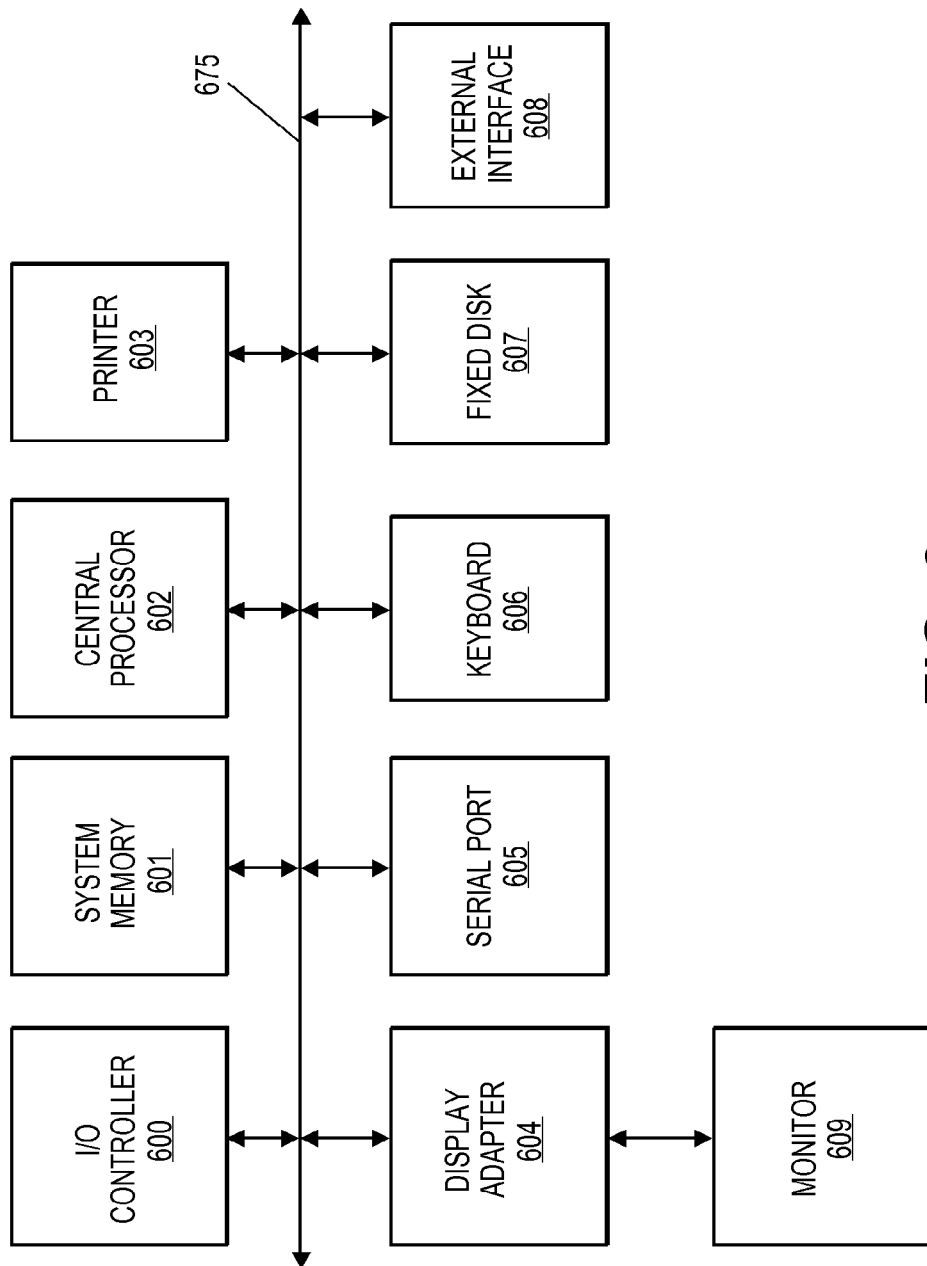
FIG. 6 shows a block diagram of an exemplary computer apparatus.

FIG. 6 is a high level block diagram of a computer system that may be used to implement any of the entities or components described above. The subsystems shown in FIG. 6 are interconnected via a system bus 675. Additional subsystems include a printer 603, keyboard 606, fixed disk 607, and monitor 609, which is coupled to display adapter 604. Peripherals and input/output (I/O) devices, which couple to I/O controller 600, can be connected to the computer system by any number of means known in the art, such as a serial port. For example, serial port 605 or external interface 608 can be used to connect the computer apparatus to a wide area network such as the Internet, a mouse input device, or a scanner. The interconnection via system bus 675 allows the central processor 602 to communicate with each subsystem and to control the execution of instructions from system memory 601 or the fixed disk 607, as well as the exchange of information between subsystems. The system memory 601 and/or the fixed disk may embody a computer-readable medium.

Storage media and computer-readable media for containing code, or portions of code, can include any appropriate media known or used in the art, including storage media and communication media, such as but not limited to volatile and non-volatile, removable and non-removable media implemented in any method or technology for storage and/or transmission of information such as computer-readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, data signals, data transmissions, or any other medium which can be used to store or transmit the desired information and which can be accessed by the computer. Based on the disclosure and teachings provided herein, a person of ordinary skill in the art will appreciate other ways and/or methods to implement the various embodiments.

The above description is illustrative and is not restrictive. Many variations of the invention may become apparent to those skilled in the art upon review of the disclosure. The scope of the invention may, therefore, be determined not with reference to the above description, but instead may be determined with reference to the pending claims along with their full scope or equivalents.

It may be understood that the present invention as described above can be implemented in the form of control logic using computer software in a modular or integrated manner. Based on the disclosure and teachings provided herein, a person of ordinary skill in the art may know and appreciate other ways and/or methods to implement the present invention using hardware and a combination of hardware and software.

Any of the software components or functions described in this application, may be implemented as software code to be executed by a processor using any suitable computer language such as, for example, Java, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

One or more features from any embodiment may be combined with one or more features of any other embodiment without departing from the scope of the invention.

A recitation of "a", "an" or "the" is intended to mean "one or more" unless specifically indicated to the contrary.

What is claimed is:

1. A method comprising:
   selecting, by a transaction processor application in a communication device, items for purchase in a transaction at a merchant server computer;
   wherein the communication device is a mobile phone;
   wherein the communication device comprises a secure element;
   identifying, by the transaction processor application in the communication device, a payment account;
   communicating, by the transaction processor application, transaction data associated with the transaction to a payment application in the secure element on the communication device;
   retrieving, by the payment application from the secure element in the communication device, a payment credential associated with the identified payment account;
   sending, by the payment application in the secure element, the payment credential to the transaction processor application;
   transmitting the payment credential, by the transaction processor application in the communication device, to the merchant server computer;
   receiving, by the merchant server computer, the transmitted payment credential; and
   initiating, by the merchant server computer, a payment transaction with the payment credential.

2. The method of claim 1, wherein the payment credential comprises a token.

3. The method of claim 2, wherein the transaction processor application is a merchant application.

4. The method of claim 1, further comprising:
   receiving, by the communication device, a selection of the payment account, the selection identifying the payment account.

5. The method of claim 1, wherein the payment credential is in encrypted form as the payment credential is transmitted from the communication device to the merchant server computer.

6. The method of claim 1, further comprising:
   receiving, by the payment application, signed transaction data from the transaction processor application; and
   validating, by the payment application, the signed transaction data using a transaction processor public key before retrieving the payment credential from the secure element in the communication device.

7. A system comprising:
   a communication device comprising:
   a first processor; and
   a first non-transitory medium, the first non-transitory medium comprising instructions when executed by the first processor, causes the first processor to perform the steps of:
   selecting, by a transaction processor application in the communication device, items for purchase in a transaction at a merchant server computer;
   wherein the communication device is a mobile phone;
   wherein the communication device comprises a secure element;
   identifying, by the transaction processor application in the communication device, a payment account;
   communicating, by the transaction processor application in the communication device, transaction data associated with the transaction to a payment application in the secure element on the communication device;
   retrieving, by the payment application from the secure element in the communication device, a payment credential associated with the identified payment account;
   sending, by the payment application in the secure element, the payment credential to the transaction processor application; and
   transmitting the payment credential, by the transaction processor application in the communication device, to the merchant server computer; and
   the merchant server computer, the merchant server computer comprising a second processor, and a second computer readable medium comprising code, executable by the second processor for performing steps including: initiating a payment transaction with the payment credential.

8. The system of claim 7, wherein the payment credential comprises a token.

9. The system of claim 7, wherein the transaction processor application is a merchant application.

10. The system of claim 7, wherein initiating the payment transaction with the payment credential includes generating an authorization request message comprising the payment credential.

11. The system of claim 7, wherein the steps further comprise:
    receiving a selection of the payment account from a user, the selection identifying the payment account.

* * * * *